US010710651B2

(12) United States Patent
Podnar

(10) Patent No.: US 10,710,651 B2
(45) Date of Patent: Jul. 14, 2020

(54) MULTI-TREAD VEHICLES AND METHODS OF OPERATING THEREOF

(71) Applicant: The Boeing Company, Chicago, IL (US)

(72) Inventor: Gregg W. Podnar, Seattle, WA (US)

(73) Assignee: The Boeing Company, Chicago, IL (US)

(*) Notice: Subject to any disclaimer, the term of this patent is extended or adjusted under 35 U.S.C. 154(b) by 229 days.

(21) Appl. No.: 16/004,089

(22) Filed: Jun. 8, 2018

(65) Prior Publication Data

US 2018/0290698 A1 Oct. 11, 2018

Related U.S. Application Data

(63) Continuation of application No. 15/179,473, filed on Jun. 10, 2016, now Pat. No. 10,023,250.

(51) Int. Cl.
*B62D 55/084* (2006.01)
*B62D 55/065* (2006.01)
(Continued)

(52) U.S. Cl.
CPC ............ *B62D 55/084* (2013.01); *B60D 1/00* (2013.01); *B62D 53/00* (2013.01);
(Continued)

(58) Field of Classification Search
CPC ..... B62D 55/084; B62D 55/0655; B64F 5/00; B64F 5/30; B64F 5/40; B64F 5/50; B64F 5/60; B60P 1/43; B65G 67/00
See application file for complete search history.

(56) References Cited

U.S. PATENT DOCUMENTS 2,056,188 A * 10/1936 Hayden ............... B64C 3/54
244/218
2,427,853 A * 9/1947 Goodlett ............. B64C 3/00
244/123.2
(Continued)

FOREIGN PATENT DOCUMENTS

EP 2653273 A1 10/2013
WO 2011116332 A2 9/2011
WO 2012129251 A2 9/2012

OTHER PUBLICATIONS

"U.S. Appl. No. 15/179,473, Notice of Allowance dated Mar. 7, 2018", 8 pages.
(Continued)

*Primary Examiner* — Jacob D Knutson
*Assistant Examiner* — Michael R Stabley
(74) *Attorney, Agent, or Firm* — Kwan & Olynick LLP

(57) ABSTRACT

Provided are multi-tread vehicles and methods of operating such vehicles to access small interior spaces. A multi-tread vehicle may include two or more tread sections such that each pair of adjacent tread sections is interconnected by a connector section. Furthermore, each pair may have one or more degrees of articulations, such as being pivotable with respect to each other around one or more axis and/or being bendable with respect to each other around one or more axis. These articulation degrees may be provided by the connector section and/or by couplings between the connector section and each tread section. In some embodiments, each tread section may include two portions detachably coupled to each other. This detachable coupling may be used for disassembly of the multi-tread vehicle after or even during its use, for example, when only a portion of the vehicle needs to be retrieved from an interior space.

21 Claims, 22 Drawing Sheets

(51) Int. Cl.
*B64F 5/60* (2017.01)
*B64F 5/10* (2017.01)
*B64F 5/40* (2017.01)
*B64F 5/45* (2017.01)
*B64F 5/50* (2017.01)
*B60D 1/00* (2006.01)
*B62D 53/00* (2006.01)
*B64F 1/04* (2006.01)

(52) U.S. Cl.
CPC ............ *B62D 55/0655* (2013.01); *B64F 1/04* (2013.01); *B64F 5/10* (2017.01); *B64F 5/40* (2017.01); *B64F 5/45* (2017.01); *B64F 5/50* (2017.01); *B64F 5/60* (2017.01)

(56) References Cited

U.S. PATENT DOCUMENTS

| | | | | |
|---|---|---|---|---|
| 4,445,582 A * | 5/1984 | Andersson | ......... | B62D 55/0655 180/9.5 |
| 4,966,242 A * | 10/1990 | Baillargeon | ......... | B62D 53/021 180/242 |
| 5,113,958 A * | 5/1992 | Holden | ......... | B62D 11/20 180/9.1 |
| 5,248,008 A * | 9/1993 | Clar | ......... | B25J 5/005 180/8.7 |
| 5,984,032 A * | 11/1999 | Gremillion | ......... | B62D 55/0655 180/14.1 |
| 6,488,306 B1 * | 12/2002 | Shirey | ......... | B60D 1/00 280/474 |
| 6,523,629 B1 * | 2/2003 | Buttz | ......... | B60D 1/00 180/14.2 |
| 6,672,413 B2 * | 1/2004 | Moore | ......... | B62D 57/024 180/9.21 |
| 6,814,169 B2 * | 11/2004 | Moore | ......... | B62D 57/024 180/9.21 |
| 6,870,343 B2 * | 3/2005 | Borenstein | ......... | B08B 9/045 180/9.21 |
| 6,880,651 B2 * | 4/2005 | Loh | ......... | B62D 12/00 180/14.2 |
| 6,889,783 B1 * | 5/2005 | Moore | ......... | B62D 57/024 180/9.21 |
| 7,845,440 B2 * | 12/2010 | Jacobsen | ......... | B62D 57/04 180/9.46 |
| 7,946,372 B2 * | 5/2011 | Shraga | ......... | B25J 5/005 180/14.1 |
| 7,950,478 B2 * | 5/2011 | Terry | ......... | B60G 5/005 180/9.46 |
| 8,042,630 B2 * | 10/2011 | Jacobsen | ......... | B62D 55/27 180/9.46 |
| 8,225,895 B1 * | 7/2012 | Salton | ......... | B62D 55/0655 180/167 |
| 8,393,422 B1 * | 3/2013 | Pensel | ......... | B62D 55/0655 180/9.4 |
| 8,606,456 B2 * | 12/2013 | Nordberg | ......... | B60K 17/04 701/29.3 |
| 8,991,528 B2 * | 3/2015 | Hellholm | ......... | B60K 6/48 180/14.2 |
| 9,004,200 B2 * | 4/2015 | Ben-Tzvi | ......... | B62D 55/02 180/6.7 |
| 9,403,566 B2 * | 8/2016 | Jacobsen | ......... | B62D 37/04 |
| 9,409,292 B2 * | 8/2016 | Smith | ......... | B25J 13/025 |
| 9,616,949 B2 * | 4/2017 | Hellholm | ......... | B62D 7/026 |
| 10,023,250 B2 | 7/2018 | Podnar | | |
| 2002/0058929 A1 | 5/2002 | Green | | |
| 2002/0153185 A1 | 10/2002 | Song et al. | | |
| 2012/0205168 A1 * | 8/2012 | Flynn | ......... | B25J 5/005 180/9.1 |
| 2014/0114482 A1 | 4/2014 | Slawinski et al. | | |
| 2014/0121835 A1 * | 5/2014 | Smith | ......... | B25J 5/005 700/259 |
| 2014/0246257 A1 * | 9/2014 | Jacobsen | ......... | B62D 37/04 180/14.2 |
| 2015/0081092 A1 * | 3/2015 | Jacobsen | ......... | B25J 5/005 700/245 |
| 2015/0148949 A1 | 5/2015 | Chin et al. | | |
| 2015/0346722 A1 | 12/2015 | Herz et al. | | |
| 2016/0083026 A1 * | 3/2016 | Hellholm | ......... | B62D 7/026 180/9.44 |
| 2016/0083027 A1 * | 3/2016 | Hellholm | ......... | B60D 5/00 180/9.44 |
| 2016/0089211 A1 | 3/2016 | Bowling | | |
| 2016/0107709 A1 * | 4/2016 | Hellholm | ......... | A01G 23/003 180/9.4 |
| 2016/0332554 A1 * | 11/2016 | Ambrosio | ......... | B60P 1/43 |
| 2017/0355080 A1 | 12/2017 | Podnar | | |
| 2017/0355405 A1 | 12/2017 | Podnar | | |

OTHER PUBLICATIONS

"U.S. Appl. No. 15/179,493, Non Final Office Action dated Feb. 23, 2018", 12 pages.

"GB Application Serial No. 1708992.1, Combined Search and Examination Report dated Dec. 1, 2017", 10 pgs.

"Stereoscopic Camera and Associated Method of Varying a Scale of a Stereoscopic Image Pair", U.S. Appl. No. 15/179,542, filed Jun. 10, 2016, 36 pgs.

Grinberg, Victor S. et al., "Geometry of Binocular Imaging", Robotics Institute, School of Computer Science, 1994, 9 pgs.

Schloerb, David W. , "A Quantitative Measure of Telepresence", Presence, vol. 4, No. 1, 1995, pp. 64-80.

* cited by examiner

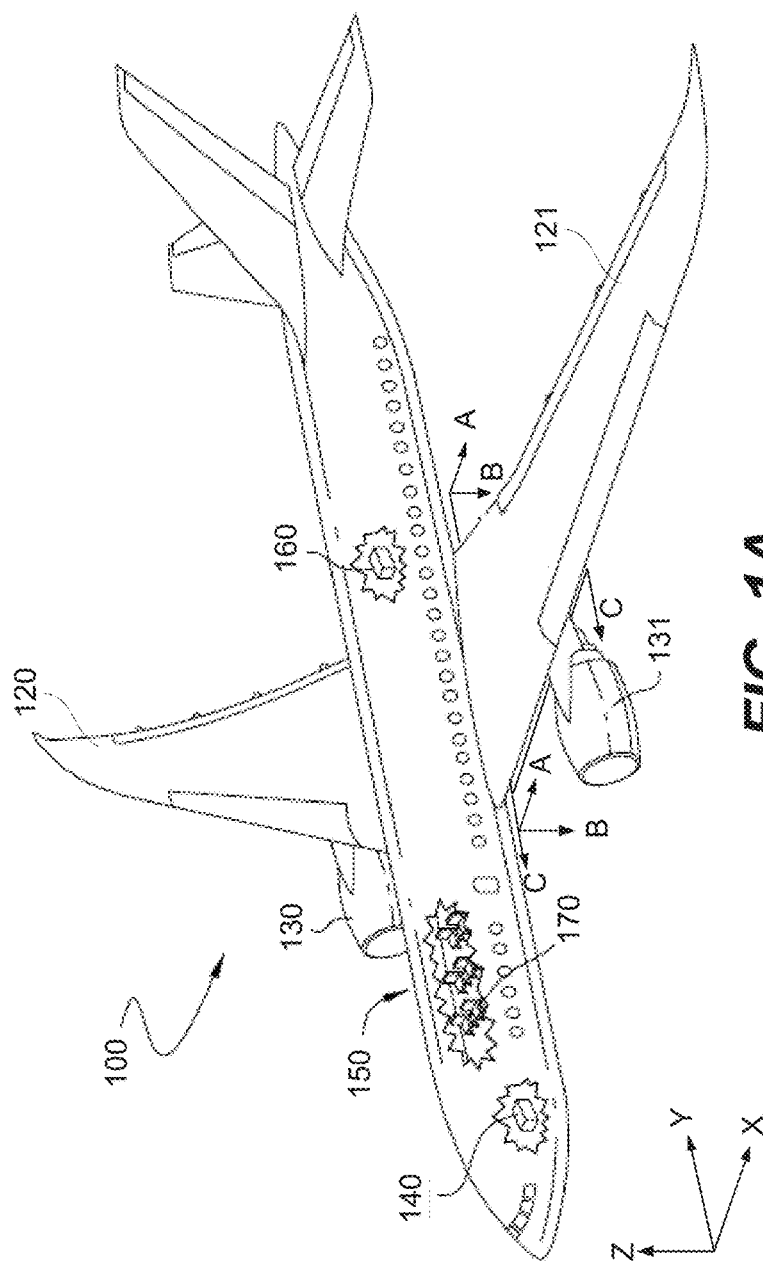
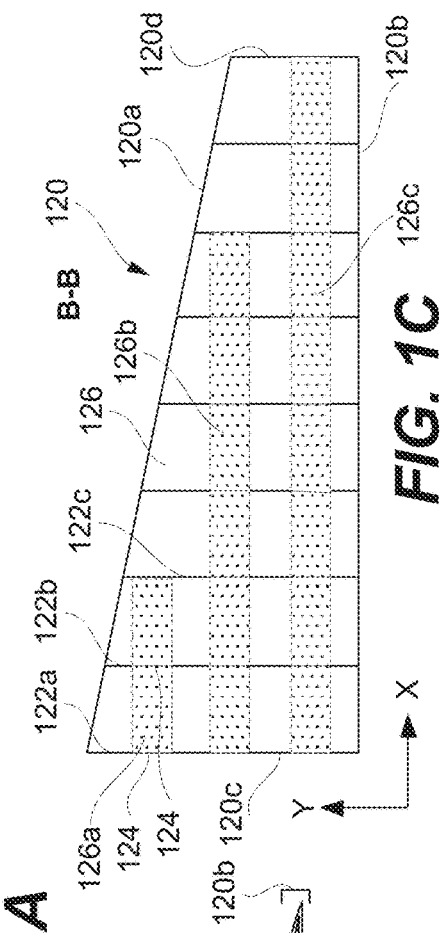
FIG. 1A
FIG. 1B
FIG. 1C

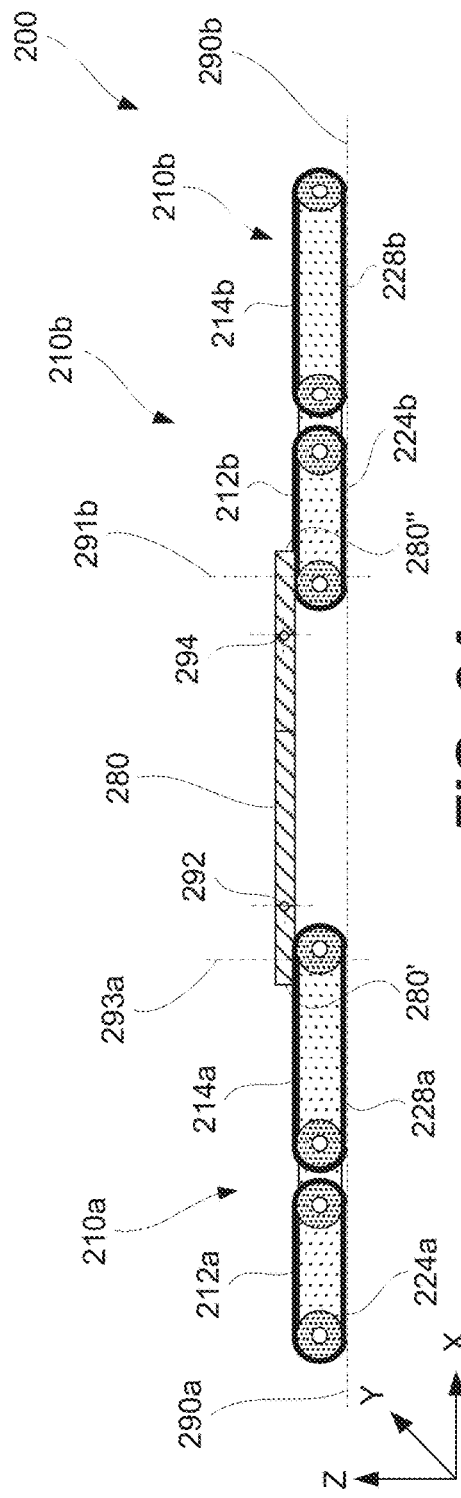
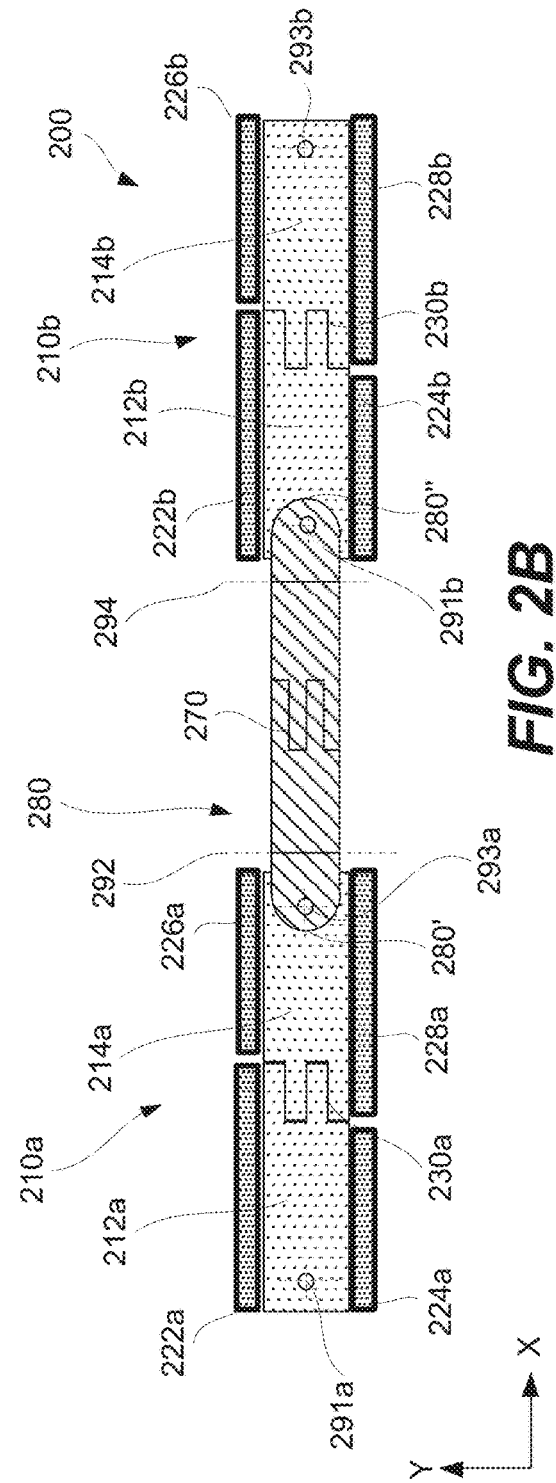

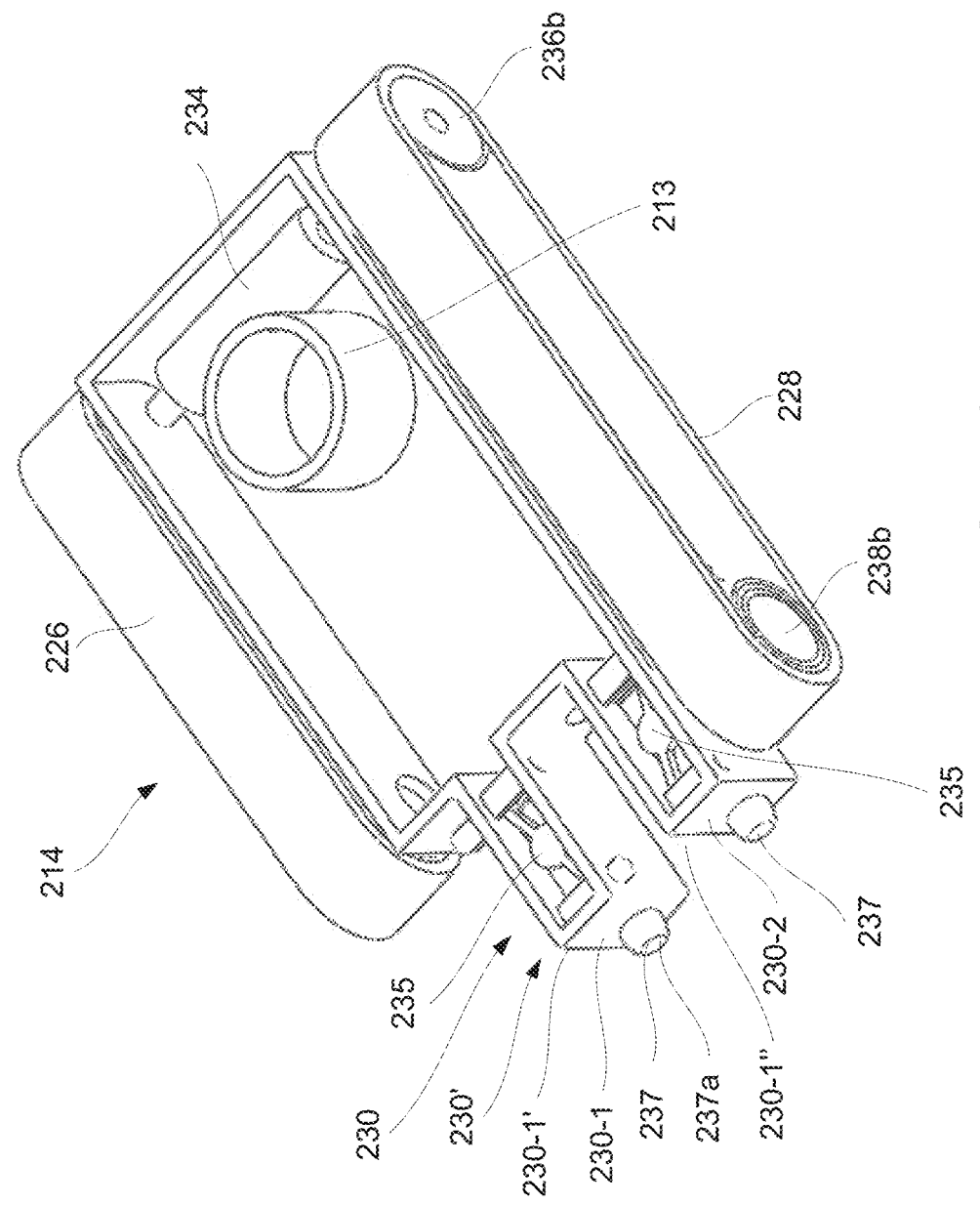

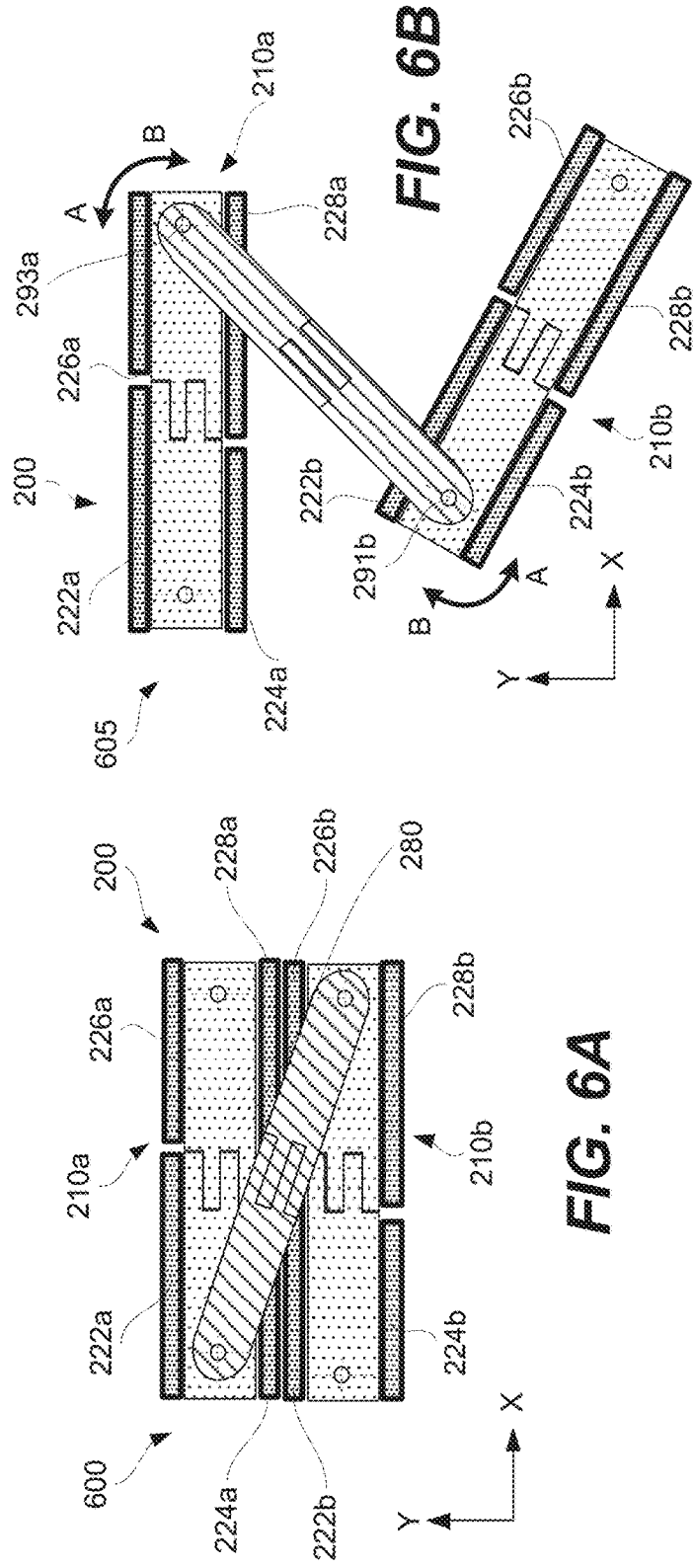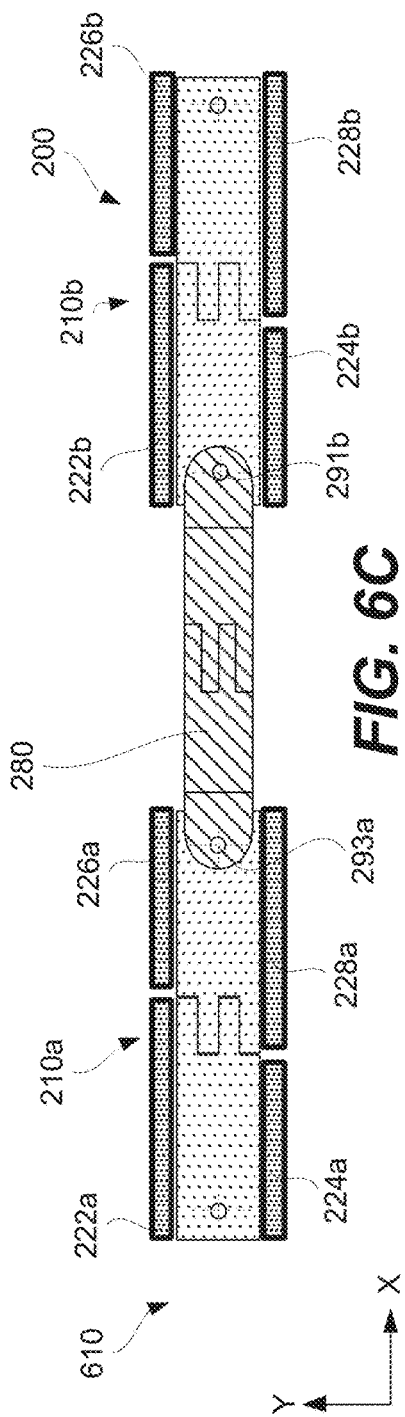

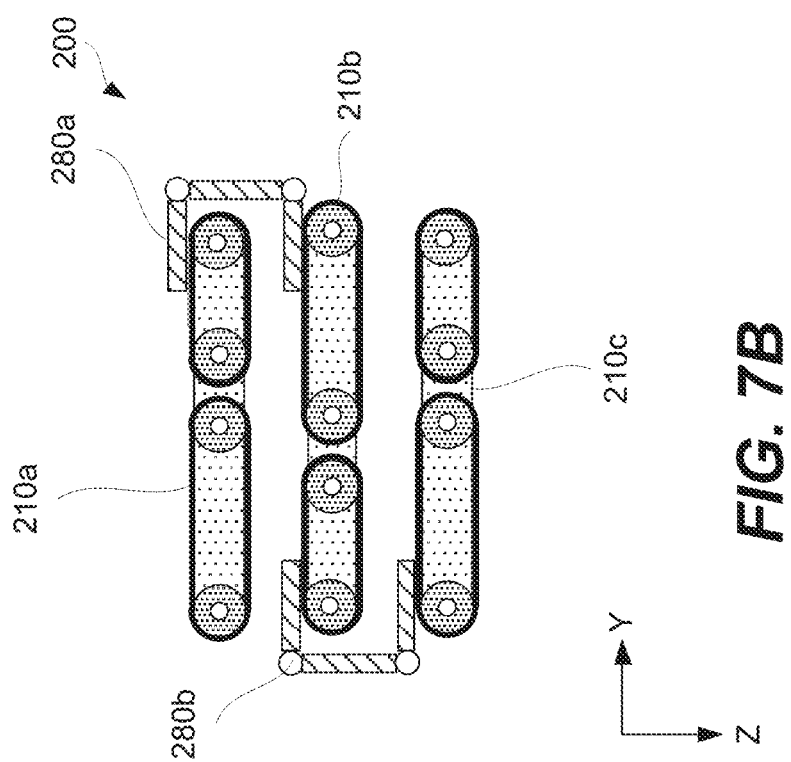

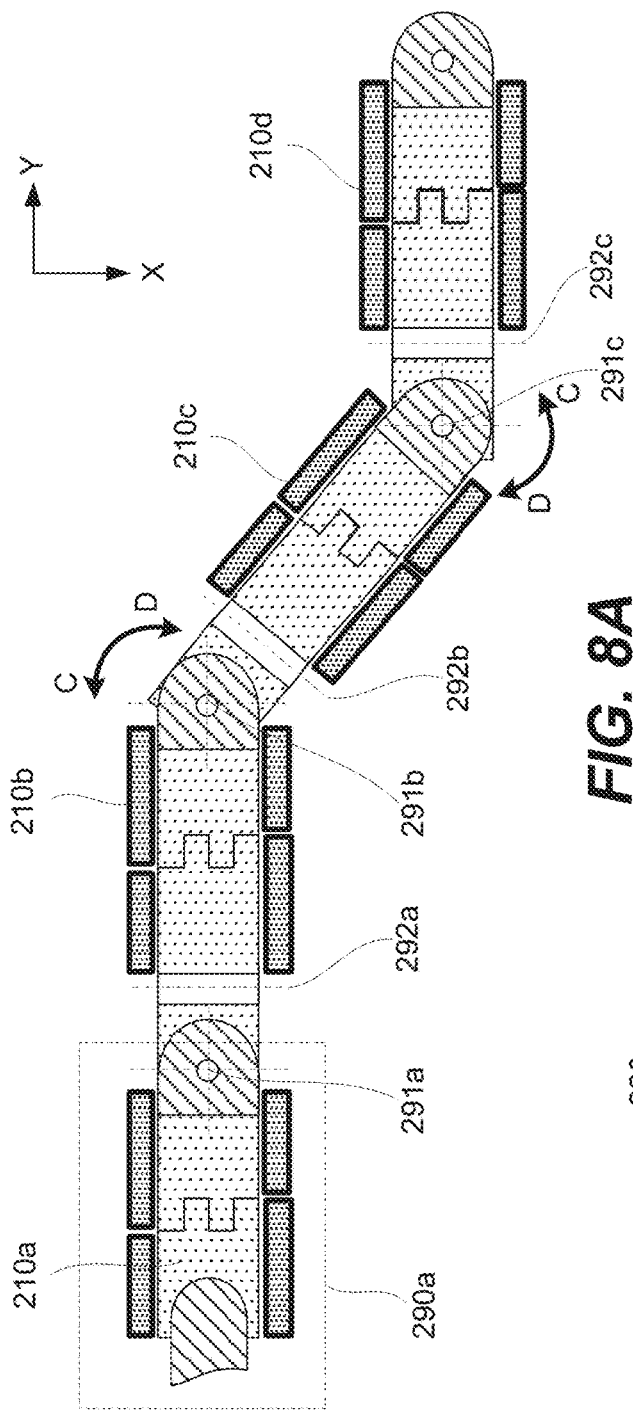
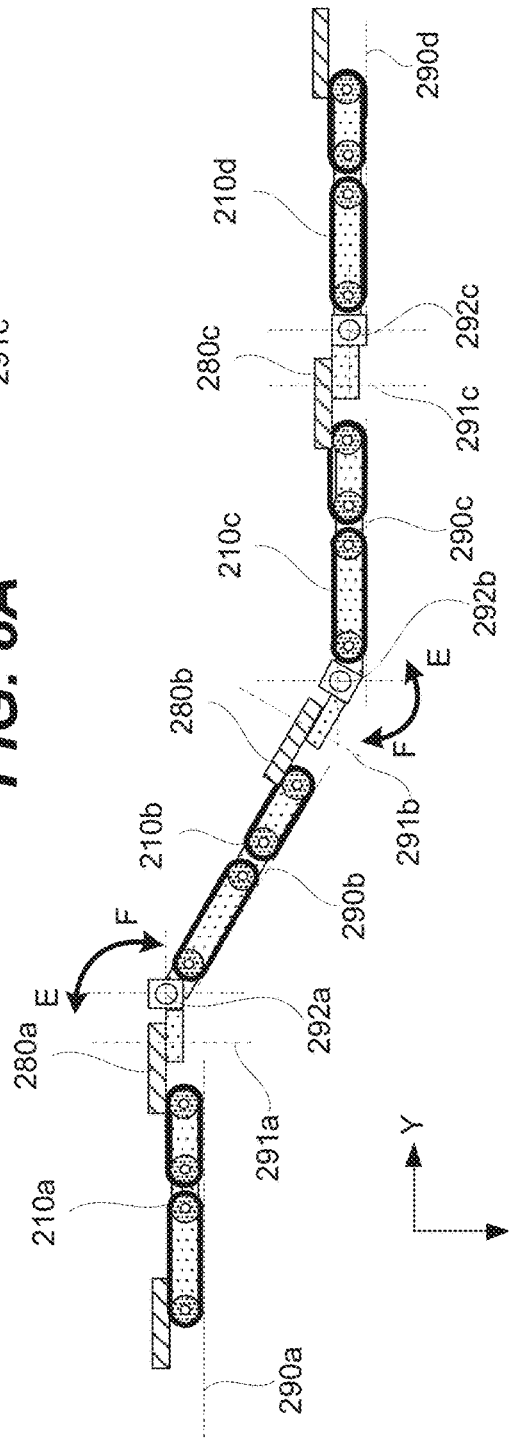

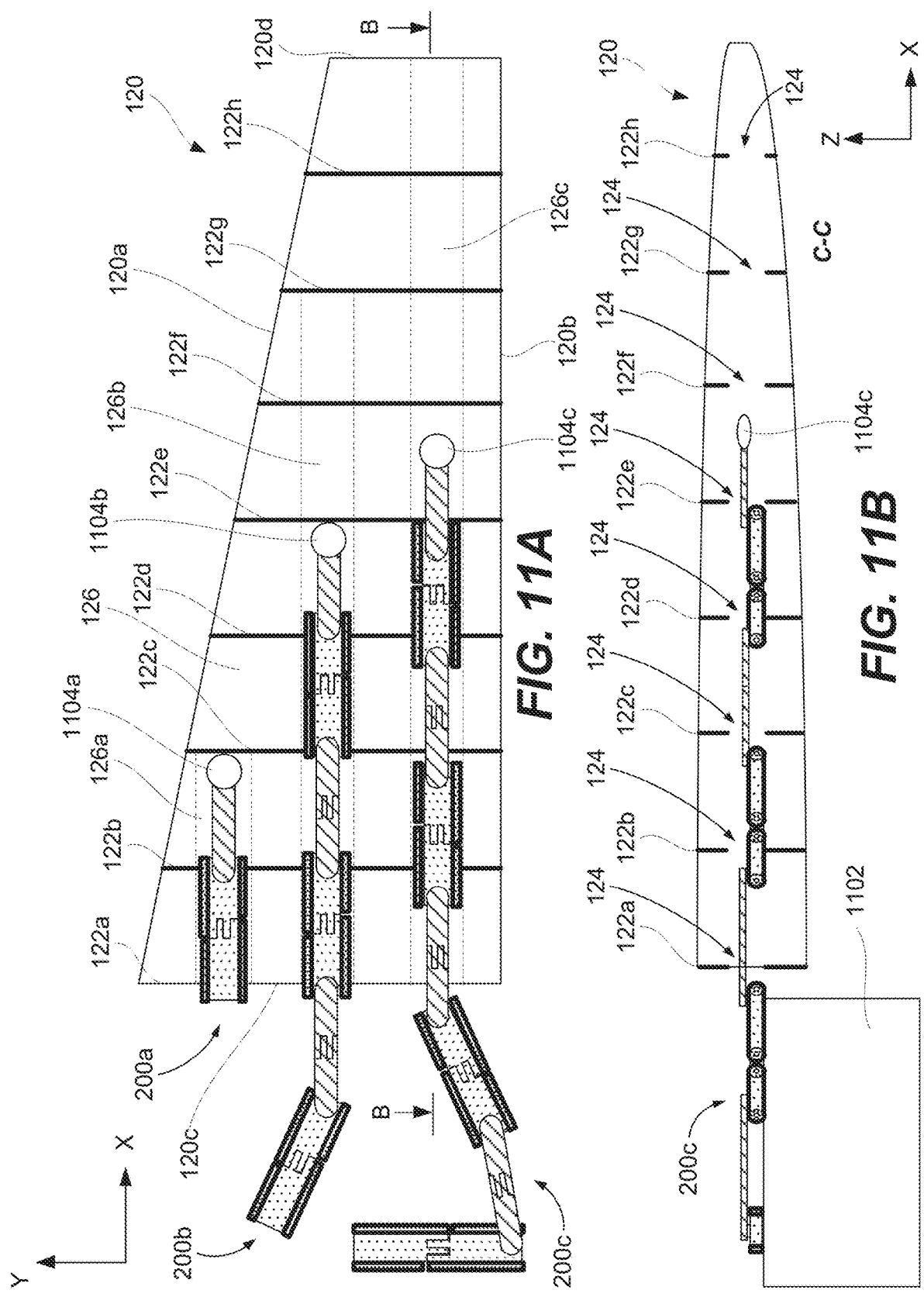

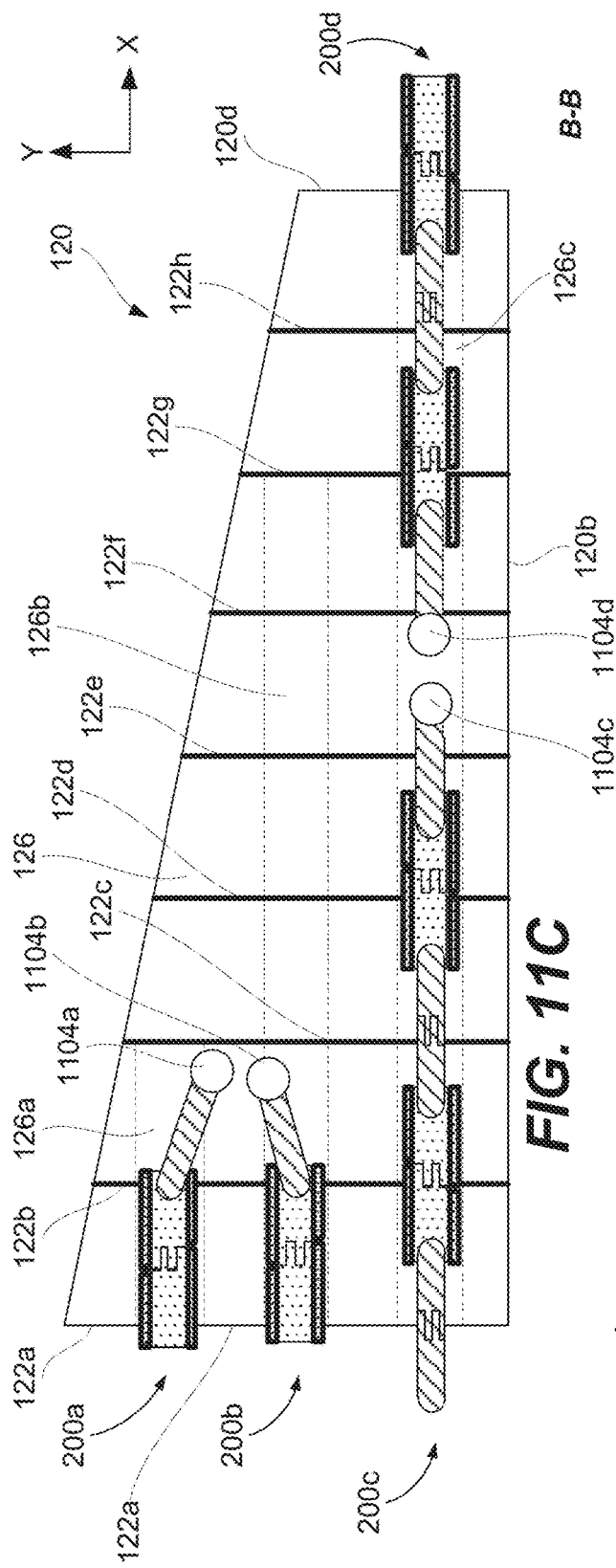
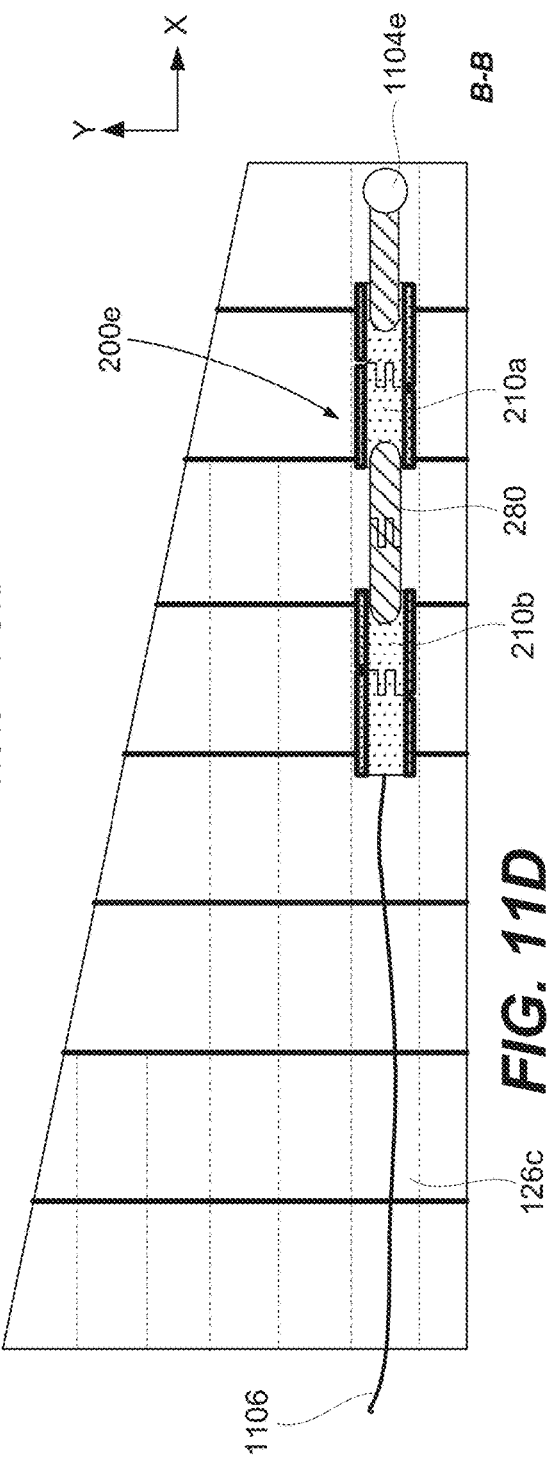
FIG. 11C
FIG. 11D

MULTI-TREAD VEHICLES AND METHODS OF OPERATING THEREOF

CROSS-REFERENCE TO RELATED APPLICATIONS

This application is a continuation of U.S. patent application Ser. No. 15/179,473, filed on 2016 Jun. 10, which has been granted as U.S. Pat. No. 10,023,250 on Jul. 17, 2018 and which is incorporated herein by reference in its entirety for all purposes.

BACKGROUND

Accessing small interior spaces, such as wing bays, during assembly and/or maintenance can be challenging. In many cases, workers access such interior spaces through various access ports, such as ports formed in the bottom skin panels of the wings and through the wing ribs. This type of human access requires sufficient large ports, which puts limitation on scaling of various components. For example, a certain minimal wing thickness is needed for access. Furthermore, external access ports need to be closed and even sealed during operation of aircraft. Finally, many interior spaces have uneven topography such as internal ribs extending from wing skin panels, which makes it difficult to navigate robotic systems during access. What is needed is a system for accessing small interior spaces, such as wing roots and wing tips, and capable of navigating within these spaces which would allow reduction in the number and/size of access ports.

SUMMARY

The following presents a simplified summary of the disclosure in order to provide a basic understanding of certain embodiments of the present disclosure. This summary is not an extensive overview of the disclosure and it does not identify key/critical elements of the present disclosure or delineate the scope of the present disclosure. Its sole purpose is to present some concepts disclosed herein in a simplified form as a prelude to the more detailed description that is presented later.

Provided are multi-tread vehicles and methods of operating such vehicles to access small interior spaces. A multi-tread vehicle may include two or more tread sections such that each pair of adjacent tread sections is interconnected by a connector section. Furthermore, each pair may have one or more degrees of articulations, such as being pivotable with respect to each other around one or more axis and/or being bendable with respect to each other around one or more axis. These articulation degrees may be provided by the connector section and/or by couplings between the connector section and each tread section. In some embodiments, each tread section may include two portions detachably coupled to each other. This detachable coupling may be used for disassembly of the multi-tread vehicle after or even during its use, for example, when only a portion of the vehicle needs to be retrieved from an interior space.

In some embodiments, a multi-tread vehicle comprises a first tread section, a second tread section, and a connector section coupled to the first rear tread portion and to the second front tread section. The first tread section may comprise a first front tread portion and a first rear tread portion detachably coupled to the first front tread portion using a first detachable tread coupling. The first front tread portion may comprise a first front right tread and a first front left tread. The first rear tread portion may comprise a first rear right tread and a first rear left tread. The second tread section may comprise a second front tread portion and a second rear tread portion detachably coupled to the second front tread portion using a second detachable tread coupling. The second front tread portion may comprise a second front right tread and a second front left tread. The second rear tread portion may comprise a second rear right tread and a second rear left tread. It should be noted that first, second, front, rear, left, and right are used for distinguishing purposes only and are not limiting to spatial orientations of the components during operation of the multi-tread vehicle which may change.

In some embodiments, the connector section is pivotable relative to the first rear tread portion around a first rear pivot axis. The first rear pivot axis is perpendicular to the plane defined by the first rear right tread and the first rear left tread. In some embodiments, the connector section is further pivotable relative to the second front tread portion around a second front pivot axis perpendicular to the plane defined by the first rear right tread and the first rear left tread. The distance between the first rear pivot axis and the second front pivot axis may represent a larger portion of the length of the connector section.

In some embodiments, the multi-tread vehicle is foldable between an extended state and a folded state. In the extended state, the first front right tread and the second front right tread are collinear. In the folded state, the first front left tread is disposed between the first front right tread and the second front right tread. Furthermore, in the folded state, the first front left tread is adjacent to and parallel to the second front right tread.

In some embodiments, the first front tread portion comprises a first front pivot axis. The distance between the first rear pivot axis and the second front pivot axis may be equal to the square root of the sum of the square of the distance between the first front pivot axis and first rear pivot axis and the square of the distance between the first front pivot axis and the second front pivot axis. In some embodiments, the distance between the first front pivot axis and the second front pivot axis is equal to a width of the first tread section.

In some embodiments, the first rear tread portion comprises a rear pivot drive engaging the connector section for pivoting the connector section relative to the first rear portion. The first rear portion may comprise a rear tread pivot coupling engaging the front connector pivot coupling of the connector section.

In some embodiments, the front end of the connector section is bendable relative to the rear end of the connector section around the front bend axis. The front bend axis may be parallel to the plane defined by the first rear right tread and the first rear left tread. Furthermore, the front connector pivot coupling of the connector section may be bendable relative to a rear connector pivot coupling of the connector section around the front bend axis.

In some embodiments, the front end of the connector section is further bendable relative to the rear end of the connector section around a rear bend axis. The rear bend axis may be parallel to the plane defined by the first rear right tread and the first rear left tread.

In some embodiments, the connector section comprises a front connector bend drive for bending the front end relative to the rear end of the connector section around the front bend axis.

In some embodiments, the connector section comprises a front connector portion and a rear connector portion detachably coupled to the front connector portion using a detachable connector coupling. The connector section may comprise a power transmission linkage interconnected to the first tread section and to the second tread section.

In some embodiments, the plane defined by the first front right tread and the first front left tread coincide with the plane defined by the second front right tread and the second front left tread. During motion of the multi-tread vehicle these planes may continue to coincide or at least remain parallel in some embodiments.

The first front right tread and the first front left tread may have different lengths. The first front right tread and the first rear left tread may have same lengths. Furthermore, the first rear right tread and the first front left tread have same lengths. In some embodiments, the first rear left tread overlaps a right tread gap between the first front right tread and the first rear right tread. Furthermore, the first front right tread overlaps a left tread gap between the first front left tread and the first rear left tread.

In some embodiments, the first front right tread and the first rear right tread are collinear. The first front left tread and the first rear left tread may also be collinear.

The first front tread portion may comprise a front tread drive coupled to the first front right tread and the first front left tread. In some embodiments, the front tread drive is operable to independent control speeds of the first front right tread and the first front left tread. The first rear portion may comprise a rear tread drive coupled to the first rear right tread and the first rear left tread. The first rear tread drive may control the speeds of the first rear right tread and the first rear left tread independently from speeds of the first front right tread and the first front left tread.

In some embodiments, the first tread section and the second tread section are identical. The second tread section may be coupled to a tether. The multi-tread vehicle may comprise one or more proximity sensors. The multi-tread vehicle may comprise a camera and a light.

In some embodiments, the first detachable tread coupling and the second detachable tread coupling are remotely controlled using, for example a wire linkage of the connector section. In some embodiments, at least the first detachable tread coupling comprises an interlocking mechanism. At least the first detachable tread coupling may comprise an connector electrically coupled to a wire linkage of the connector section. This connector may provide one or more electrical, pneumatic, and/or hydraulic connections as well as mechanical rigidity to the detachable coupling. In some embodiments, the connector may be a part of one or more of control lines (e.g., electrical, fiber optic, and the line), hydraulic lines, and/or pneumatic lines of the multi-tread vehicle.

Provided also is a method for accessing an interior space of aircraft using a multi-tread vehicle. The method may comprise positioning the multi-tread vehicle at an opening to the interior space of aircraft and advancing at least the first tread section of the multi-tread vehicle at an opening to the interior space.

In some embodiments, the multi-tread vehicle comprises a first tread section, a second tread section, and a connector section coupled to the first rear tread portion and to the second front tread section. The first tread section may comprise a first front tread portion and a first rear tread portion detachably coupled to the first front tread portion using a first detachable tread coupling. The first front tread portion may comprise a first front right tread and a first front left tread. The first rear tread portion may comprise a first rear right tread and a first rear left tread. The second tread section may comprise a second front tread portion and a second rear tread portion detachably coupled to the second front tread portion using a second detachable tread coupling. The second front tread portion may comprise a second front right tread and a second front left tread. The second rear tread portion may comprise a second rear right tread and a second rear left tread.

In some embodiments, advancing the first tread section comprises rotating the first front right tread and the first front left tread while the first front right tread and the first front left tread contact a portion of an edge defining the opening. In some embodiments, the first tread section and the connector section are collinear while advancing the first tread section. In some embodiments, the first tread section is simultaneously supported by at least two edges for at least for a period of time while advancing the first tread section.

In some embodiments, the method further comprises pivoting the first tread section relative to the connector section. Pivoting the first tread section may at least partially overlap in time with advancing the first tread section. Pivoting the first tread section may be performed while both the first tread section and the connector section are positioned within the interior space. Furthermore, the method may comprise pivoting the second tread section relative to the connector section while advancing the first tread section into the interior space.

In some embodiments, the method further comprises bending the connector section. Bending the connector section may at least partially overlap in time with advancing the first tread section.

These and other embodiments are described further below with reference to the figures.

BRIEF DESCRIPTION OF THE DRAWINGS

FIG. 1A is a schematic illustration of an aircraft, in accordance with some embodiments.

FIGS. 1B and 1C are schematic cross-sectional views of the wing of the aircraft illustrated in FIG. 1A, in accordance with some embodiments.

FIGS. 2A and 2B are schematic side and top views of a multi-tread vehicle, in accordance with some embodiments.

FIGS. 3A-3C are schematic views of a tread section of a multi-tread vehicle and portion of the tread section, in accordance with some embodiments.

FIGS. 6A-6C are schematic top views of a multi-tread vehicle during different folding states, in accordance with some embodiments.

FIGS. 7A-7B are schematic side views of a multi-tread vehicle showing bending of connector sections of the vehicle, in accordance with some embodiments.

FIGS. 8A and 8B are schematic top and side views of a multi-tread vehicle showing a combination of bending and pivoting, in accordance with some embodiments.

FIGS. 11A-11D are schematic views of multi-tread vehicles within interior spaces at different stages of the method, in accordance with some embodiments.

DETAILED DESCRIPTION

Figure 3A:
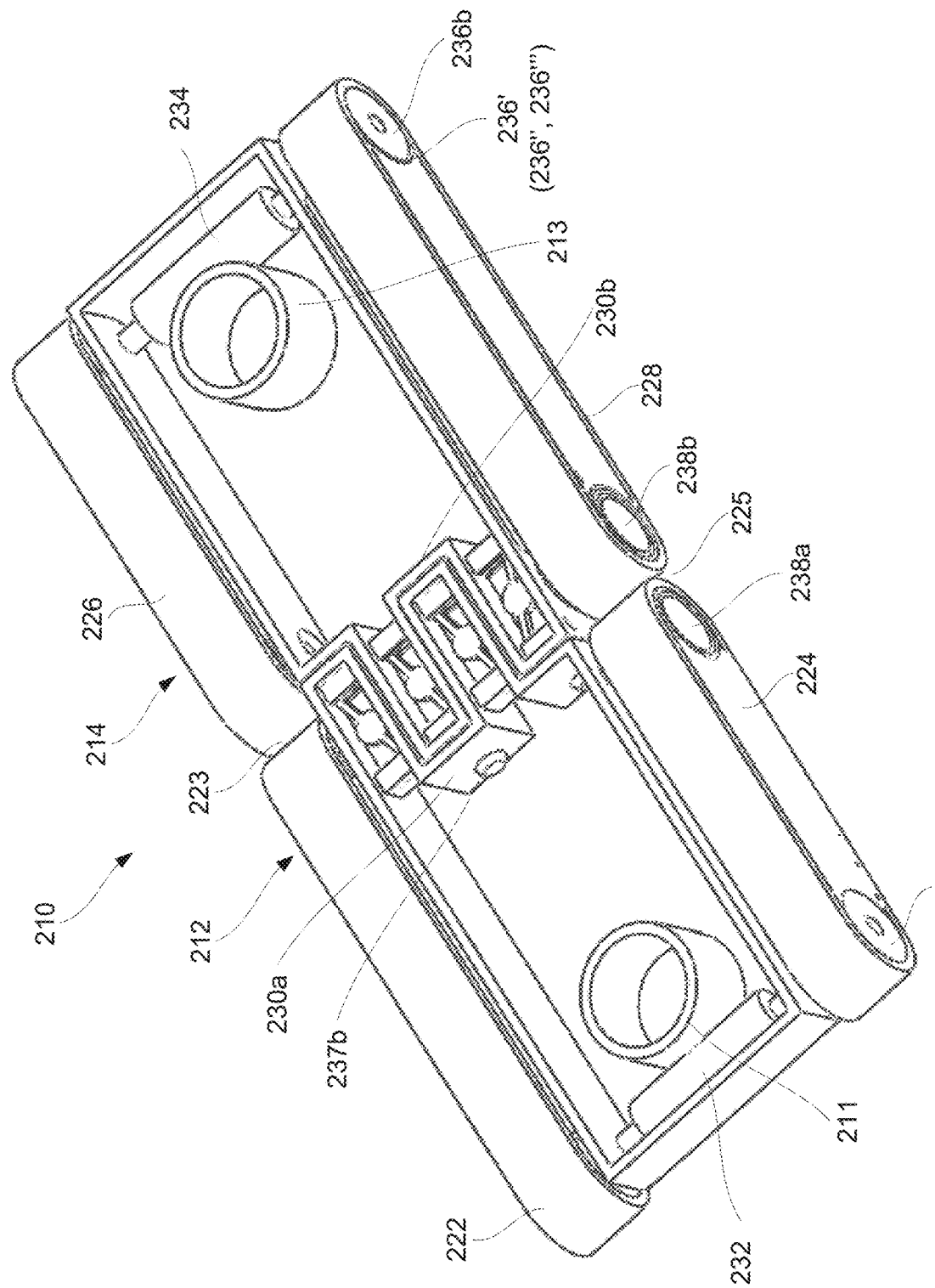

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific embodiments, it will be understood that these embodiments are not intended to be limiting. On the contrary, it is intended to cover alternatives, modifications, and equivalents as may be included within the spirit and scope of the present disclosure as defined by the appended claims.

For example, the techniques of the present disclosure will be described in the context of particular aircraft structures, such as interior wing bay compartments. However, it should be noted that the techniques and mechanisms of the present disclosure apply to various other confined and limited spaces and/or structures such as flaps, stabilizers, rudders, slats, ailerons, reels, crowns, and the like. In the following description, numerous specific details are set forth in order to provide a thorough understanding of the present disclosure. Particular example embodiments of the present disclosure may be implemented without some or all of these specific details. In other instances, well known process operations have not been described in detail in order not to unnecessarily obscure the present disclosure.

Throughout the present disclosure, the terms "front," "rear," "first," "second," "right," and "left" may be used to describe particular elements in the following figures. However, such terms are used merely for identification and descriptive purposes and are not meant to specifically fix any element in any particular position or orientation. For example, when advancing the multi-tread vehicle in its operating environment the rear tread portion may be moving ahead of the front tread portion. In the same or another example, a second front tread section may be ahead of a first front tread section. Likewise, the right and left orientations are relative to the position of an observer and may change as the multi-tread vehicle moves. For purposes of this disclosure, a "tread" is defined as a continuous track, a continuous band of treads, a continuous band of track plates, or other like devices supported by at least two wheels and driven by at least one of these wheels. Various techniques and mechanisms of the present disclosure will sometimes be described in singular form for clarity. However, it should be noted that some embodiments include multiple iterations of a technique or multiple instantiations of a mechanism unless noted otherwise.

Introduction

The present disclosure describes a novel multi-tread vehicle for accessing interior spaces, such as wing bays to conduct assembly, repair, and inspection tasks. The multi-tread vehicle may be also referred to as a robotic arm and includes multiple tread sections such that each pair of adjacent tread sections is interconnected by a connector section. Each tread section includes multiple treads configured to engage supporting structures inside the interior space and to move this tread section and, as a result, the corresponding portion of the multi-tread vehicle within the interior space. In other words, the treads of each tread section are used to advance the vehicle within the interior space. Each pair of adjacent tread sections may be articulated with respect to each other such as pivot with respect to each other around one or more axes and/or bend with respect to each other around one or more axes. For example, pivoting articulations may be used to extend the multi-tread vehicle into the interior space and/or to fold into a compact format (e.g., a storage magazine). In some embodiments, the pair of adjacent tread sections are articulated with all pivot axes aligned vertically to allow passive support of cantilevered deployment.

In some embodiments, the multi-tread vehicle is used to access the interior of an aircraft wing through various access ports positioned through rib, spar support structures, lower and upper wing skin panels, and the like. The multi-tread vehicle may be configured to span at least one wing bay compartment such that it is supported by at least two bottom edges of each access port. More specifically, the length of each treaded section and the length of the connector section may be such that the pair of adjacent treaded section is always supported by at least two structures (e.g., bottom edges of access ports) within the interior space.

FIG. 1A is a schematic illustration of aircraft 100, in accordance with some embodiments. As depicted in FIG. 1A, aircraft 100 is defined by a lateral axis (X-axis), a longitudinal axis (Y-axis), and a vertical axis (Z-axis). In various embodiments, aircraft 100 comprises airframe 150 with interior 170. Aircraft 100 includes right wing 120 and left wing 121 coupled to airframe 150. Aircraft 100 also includes engine 130 coupled to right wing 120 and engine 131 coupled to left wing 121. In some embodiments, aircraft 100 further includes a number of high-level inspection systems 140 and 160, further described below in conjunction with FIG. 12. Aircraft 100 shown in FIG. 1A is one example in which a foldable robotic arm, such as multi-tread vehicle 200, may be implemented to access interior 126 of wings 120 and/or 121 to conduct assembly, repair, and/or other inspection tasks, in accordance with an illustrative embodiment.

FIGS. 1B and 1C are schematic cross-sectional views of wing 120 and/or wing 121 of aircraft 100 illustrated in FIG. 1A, in accordance with some embodiments.

Specifically, FIG. 1B is a lateral cross-section of wing 120 from the A-A viewpoint (identified in FIG. 1A) corresponding to the lateral axis. FIG. 1C is a horizontal bottom-view cross-section of wing 120 from the viewpoint (identified in FIG. 1A) corresponding to the vertical axis. As depicted in FIGS. 1B and 1C, wing 120 may be a semi-hollow structure having interior space 126. Wing 120 is defined by leading edge 120*a*, trailing edge 120*b*, inboard end 120*c*, and outboard end 120*d*. As depicted in FIG. 1B, wing 120 includes one or more ribs 122. Each rib 122 comprises a thin structure that may extend from leading edge 120*a* of wing 120 to trailing edge 120b of wing 120. Specifically, each rib 122 may extend in the direction perpendicular to the lateral axis X-axis) of aircraft 100.

In some embodiments, wing 120 includes one or more ribs 122. Specifically, FIG. 1C identifies rib 122a, rib 122b, and 122c. However, one having ordinary skill in the art would understand that any number of ribs 122 may be positioned within interior space 126. In some embodiments, multiple ribs 122 are configured along the lateral axis (x-axis) of aircraft 100, between inboard end 120c and outboard end 120d, separating interior 126 into one or more wing bay compartments. In some embodiments, ribs 122 are placed at equal intervals such that the width of each wing compartment between ribs 122 is equal in length. In various embodiments, ribs 122 may be manufactured from metal, carbon fiber, woods and/or other suitable materials and contribute to giving shape to wing 120 and/or serve as attachment points for control surfaces, flaps, undercarriage, and engines 130 and 131. In some embodiments, rib 122a defines the inboard end 120c, and may also be known as a compression rib or a bulkhead rib.

As depicted in FIG. 1B, wing 120 includes one or more openings 124 defined by edges 125. In some embodiments, openings 124 are access ports allowing advancement of multi-tread vehicle 200 into wing 120 and through ribs 122. The cross-sectional view of FIG. 1B depicts rib 122 with three openings 124. However, rib 122 may include more or fewer openings 124. In some embodiments, openings 124 are equal in size. Openings 124 may be aligned along the Y direction or may be offset with respect to each other in the Z direction (e.g., staggered in the Z direction with respect to each other). In some embodiments, one or more openings 124 or access ports may provide access into wing 120 from edge 120a, and other openings 124 may be located on spars, or other support structures, that run laterally along wing 120 from inboard end 120c to outboard end 120d.

In some embodiments, one or more openings 124 of one rib 122 are aligned with one or more openings 124 of another rib 122 as schematically shown in FIG. 1C illustrating the bottom cross-sectional view of wing 120. Ribs 122 may extend parallel to each, which means openings 124 provided on different ribs may extend parallel to each other. Furthermore, edges 126 of opening 124 may extend parallel to each other as a result. In some embodiments, aligned openings 124 may define operating paths within interior space 126, such as interior operating paths 126a, 112b, and 126c, depicted as shaded areas in FIG. 1C. In various embodiments, openings 124 may allow a foldable robotic arm, or other mechanical device, such as multi-tread vehicle 200, to access various portions of wing bays within interior space 126 of wing 120 that are separated by ribs 122. In some embodiments, openings 124 may not be linearly aligned, such that an internal operating paths, has a curved configuration.

Examples of Multi-Tread Vehicles

FIGS. 2A and 2B are schematic side and top views of multi-tread vehicle 200, in accordance with some embodiments. According to various embodiments, multi-tread vehicle 200 comprises first tread section 210a, second tread section 210b, and connector section 280 coupled to first tread section 210a and to second tread section 210b. Each of first tread section 210a and second tread section 210b may include multiple treads. In the depicted example, first tread section 210a includes first front tread portion 212a and first rear tread portion 214a, such that first front tread portion 212a comprises first front right tread 222a and first front left tread 224a while first front rear portion 214a comprises first rear right tread 226a and first rear left tread 228a. First front tread portion 212a and first rear tread portion 214a may be coupled by first detachable tread coupling 230a as further described below, First tread section 210a may be pivotably coupled to connector section 280 defined by first rear pivot axis 293a. FIG. 2B also illustrates first front pivot axis 291a allowing first tread section 210a to pivot about axis 291a relative to another connector section as further described below with reference to FIGS. 6A-6C.

Second tread section 210b and any other tread sections, if present, may have a design similar to first tread section 210a. In some embodiments, all tread sections of multi-tread vehicle 200 are identical. As shown in FIGS. 2A and 2B, second tread section 210b may include second front tread portion 212b and second rear tread portion 214b, such that second front tread portion 212b comprises second front right tread 222b and second front left tread 224b while second rear tread portion 214b comprises second rear right tread 226b and second rear left tread 228b. Second front tread portion 212b and second rear tread portion 214b may be coupled using second detachable tread coupling 231. Furthermore, second tread section 210b may have corresponding second front pivot axis 291b and second rear pivot axis 293b when second tread section 210b is pivotably coupled to connector sections, as further described below with reference to FIGS. 6A-6C.

As shown in FIGS. 2A and 2B, connector section 280 may include front end 280' and rear end 280" such that front end 280' faces first tread section 210a and rear end 280' faces second tread section 210b. Similar to tread sections, connector section 280 may also include two portions detachably coupled by detachable connector coupling 270, as further described below with reference to FIGS. 5A-5B and FIGS. 4A-4C. In some embodiments, connector section 280 may include one or more of front bend axis 292 and rear bend axis 294 as further described below with reference to FIGS. 5A-5B and FIGS. 7A-7C.

In some embodiments, front end 280' of connector section 280 is coupled to first tread section 210a at first rear tread portion 214a. rear end 280" of connector section 280 may be coupled to second tread section 210b at second front tread section 212b. The coupling between connector section 280 and first tread section 210a may be pivotable and defined by first rear pivot axis 293a. Likewise, the coupling between connector section 280 and second tread section 210b may be pivotable and defined by second front pivot axis 291b. In some embodiments, the distance between first rear pivot axis 293a and second front pivot axis 291b may represent a larger portion of length of connector section 280. Connector section 280 may be equal in length to both first tread section 210a and second tread section 210b. In some embodiments, the distance between first rear pivot axis 293a and second front pivot axis 291b and the lengths of corresponding sections are such that first tread section 210a and second tread section 210b can fold in order to stack adjacent to each other in folded state 600, as further described below and in conjunction with FIGS. 6A-6D. Furthermore, the gap between first tread section 210a and second tread section 210b may be less than the distance between adjacent support points (e.g., ribs 122 of wing 120) when multi-tread vehicle 200 is advanced with its operating environment. Likewise, the length of each tread section 210 may be greater than that distance between adjacent point. As such, when first tread section 210a reaches a new support point before second tread section 210b leaves its support point and vice versa.

As noted above, connector section 280 may pivot relative to first rear tread portion 214a around first rear pivot axis 293a. First rear pivot axis 293a may be perpendicular to plane 290a defined by first rear right tread 226a and first rear left tread 228a. Specifically, plane 290a may be defined by support points of first rear right tread 226a and first rear left tread 228a during operation of multi-tread vehicle 200.

Connector section 280 may be also pivotable relative to second front tread portion 212b around second front pivot axis 291b. Second front pivot axis 291b may be also perpendicular to plane 290a or to plane 290b defined by second front right tread 222b and second front left tread 224b. In some embodiments, plane 290a coincides with plane 290b. During motion of multi-tread vehicle 200 these planes 290a and 290b may continue to coincide (e.g., when connector section 280 does not bend relative to either tread portion and multi-tread vehicle 200 remains planar) or at least remain parallel (e.g., when connector section 280 is synchronously bent with respect to both adjacent tread sections by the same angle by in the opposite direction).

In some embodiments, tread sections 210a and 210b and connector section 280, may be constructed from any suitable materials including, but not limited to, metals, plastics, fiberglass, etc., or combination of materials that provides the desired strength, flexibility, durability, weight, water resistance, or other desired physical characteristic.

Examples of Tread Sections

Figure 3B:
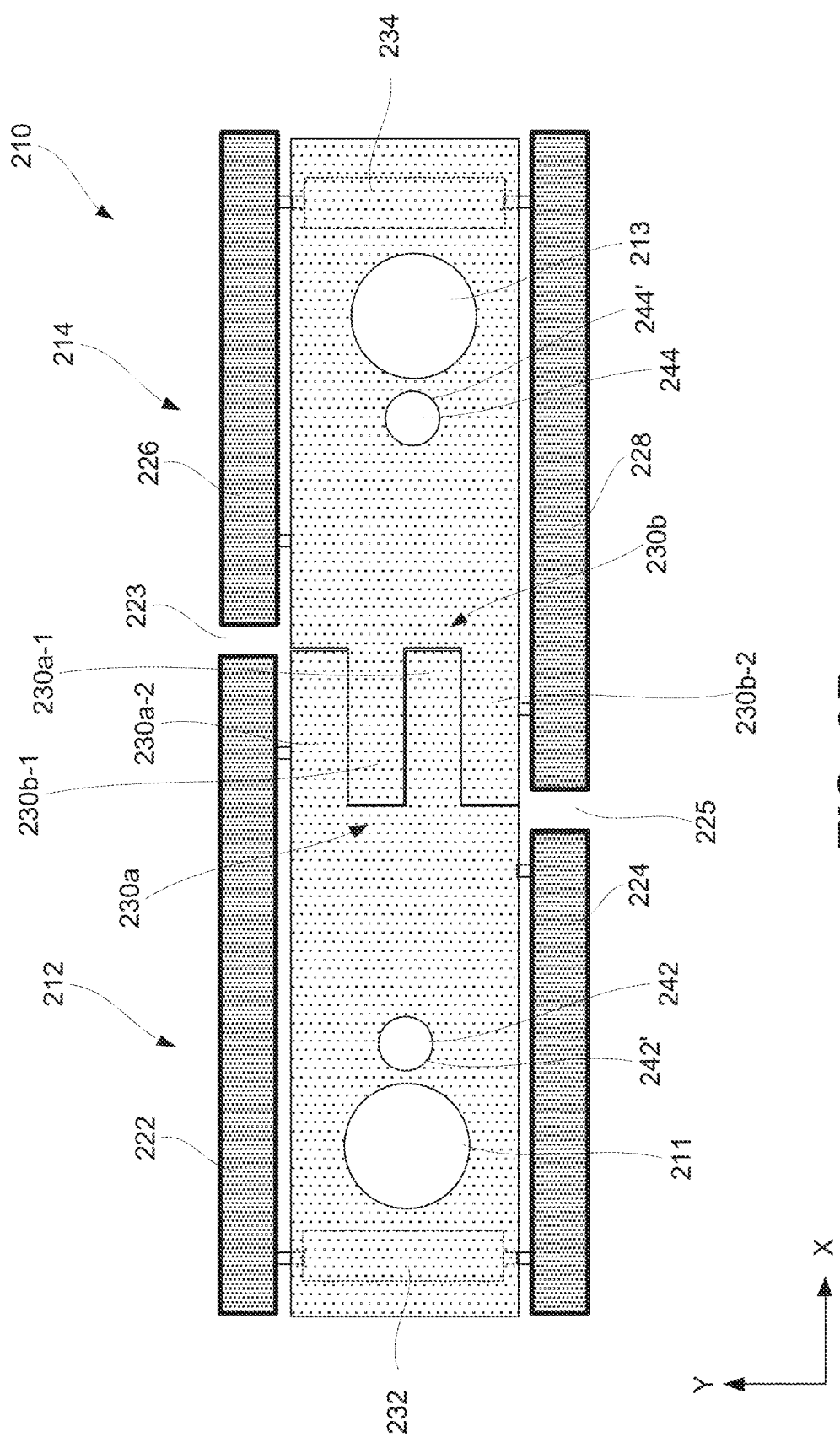

FIGS. 3A-3C illustrate schematic views of one tread section 210 of multi-tread vehicle 200, in accordance with some embodiments. Tread section 210 depicted in FIG. 3A may be tread section 210a or 210b previously described in FIGS. 2A and 2B. FIG. 3B depicts a top-down view of tread section 210. As noted below, tread section 210 may comprise front tread portion 212 and rear tread portion 214. Front tread portion 212 and rear tread portion 214 may be identical structures rotated 180 degrees relative to one another. Furthermore, front tread portion 212 and rear tread portion 214 may be detachably coupled to each other by detachable tread coupling 230 formed by a part of detachable tread coupling 230 of front tread portion 212 and a part of detachable tread coupling 230 of rear tread portion 214.

Tread section 210 also includes front tread pivot coupling 211 and rear tread pivot coupling 213 for coupling, for example, to two separate connector sections. Tread pivot coupling 213 may include drives for pivoting tread section 210 relative to a corresponding connector section. In some embodiments, tread pivot coupling 213 comprises electrical, pneumatic, hydraulic, signal, and/or other types of connections for connecting tread section 210 to the corresponding connector section. Alternatively, one or more of these connections may be provided between tread section 210 and the corresponding connector section away from tread pivot coupling 213.

Front tread pivot coupling 211 may be a part of front tread portion 212, while rear tread pivot coupling 213 may be a part of rear tread portion 214. It should be noted that when front tread portion 212 and rear tread portion 214 are detached from each other, tread pivot couplings 211 and 213 may be remain coupled to their respective connector sections.

Pivot axes may be centered within the tread pivot couplings, such as first rear pivot axis 293a and second front pivot axis 291b. For example, referring to FIGS. 2A and 2B, front tread pivot coupling 211 may be located on first front tread portion 212a and centered around first front pivot axis 291a, or on second front tread portion 212b and centered around second front pivot axis 291b. Additionally, rear tread pivot coupling 213 may be located on first rear tread portion 214a and centered around first rear pivot axis 293a, or on second rear tread portion 214b and centered around second rear pivot axis 293b.

Furthermore, as noted above, tread section 210 includes front right tread 222, front left tread 224, rear right tread 226, and rear left tread 228. Front right tread 222 and front left tread 224 may be parts of front tread portion 212, while rear right tread 226 and rear left tread 228 may be parts of rear tread portion 214. In some embodiments, the lengths of treads 222, 224, 226, and 228 may vary in length. As depicted in FIGS. 3A and 3B, front right tread 222 and front left tread 224 have different lengths, with front right tread 222 being longer than front left tread 224 in this particular example.

Additionally, rear right tread 226 and rear left tread 228 may have different lengths with rear left tread 228 being longer than rear right tread 226, in this example. These differences in tread lengths offset the right tread gap 223 and left tread gap 224, for example, in the X direction as shown in FIG. 3B. This offset allows for tread section 210 to travel through a minimal support surface (e.g., a rib) while being supported by at least one tread at all times. In some embodiments, front right tread 222 and rear left tread 228 have the same lengths, and rear right tread 226 and front left tread 224 have the same lengths.

Front right tread 222 and rear right tread 226 may be collinear. Furthermore, Front right tread 222 and rear right tread 226 may be separated by tight tread gap 223. Similarly, front left tread 224 and rear left tread 228 may also be collinear. Furthermore, front left tread 224 and rear left tread 228 may be separated by left tread gap 225. In some embodiments, the lengths and orientations of treads 222, 224, 226, and 228 are configured such that rear left tread 228 overlaps right tread gap 223 between front right tread 222 and rear right tread 226. Furthermore, the treads may be configured such that front right tread 222 overlaps left tread gap 225 between first front left tread 224 and rear left tread 228.

The significance of the gaps and overlaps is such that when tread section 210 or, more generally, multi-tread vehicle 200 is advanced, front right tread 222 and rear right tread 226 may lose contact with a supporting structure (e.g., an edge) while right tread gap 223 is passing over this supporting structure. Likewise, right tread 222 and rear right tread 226 may lose contact with a supporting structure (e.g., an edge) while left tread gap 225 is passing over this supporting structure. To ensure that at least one of front right tread 222, front left tread 224, rear right tread 226, and rear left tread 228 continuously maintain contact with the supporting structure, right tread gap 223 and left tread gap may be offset from each other and overlap with corresponding treads.

In some embodiments, front right tread 222 and front left tread 224 extend beyond the uncoupled (to another portion) end of front tread portion 212, and rear right tread 226 and rear left tread 228 extend beyond the uncoupled end of rear tread portion 214. Such configuration allows the treads to make contact with structures situated above plane 290a and/or 290b, and prevent contact between such structures with non-treaded bodies of front tread portion 212 and/or rear tread portion 214. As such, tread section 210 may have some climbing capabilities provided by its threads. These capabilities may be further enhanced by bending of multi-tread vehicle 200 as further described below with reference to FIG. 5A and FIGS. 7-8.

In some embodiments, front right tread 222, front left tread 224, rear right tread 226, and rear left tread 228 may be constructed of rubber, metal, or other material or combination of materials that provides the desired strength, flexibility, durability, grip, or other desired physical characteristic for a moving tread mechanism. To propel tread section 210, treads 222, 224, 226, and 228 may be coupled to tread drives, such as front tread drive 232 and rear tread chive 234. As shown in FIG. 3A, front tread portion 212 comprises front tread drive 232 coupled to front right tread 222 and front left tread 224. Specifically, front right tread 222 and front left tread 224 may be each coupled to a separate wheel structures, of front tread drive 232, such as front left drive wheel 236a shown in FIG. 3A. Front right tread 222 and front left tread 224 may be each further coupled to a supporting wheel structures, such as front left non-drive wheel 238a. As further depicted in FIG. 3A, rear tread portion 214 may comprise rear tread drive 234 coupled to rear right tread 226 and rear left tread 228. In some embodiments, rear right tread 226 and rear left tread 228 are each coupled to wheel portions of rear tread drive 234 such as rear left drive wheel 236b. In some embodiments, rear right tread 226 and rear left tread 228 are each further coupled to a supporting wheel structures, such as rear left non-drive wheel 238b.

Front right tread 222 and front left tread 224 may be driven by the same drive, e.g., front tread drive 232, or different drives. For example, each of front right tread 222 and front left tread 224 may be coupled to a separate drive thereby allowing for different speeds of front right tread 222 relative to front left tread 224. This approach is further described below and may be also used for rear right tread 226 and rear left tread 228.

Because front tread portion 212 and rear tread portion 214 may be identical structures rotated 180 degrees, rear left drive wheel 236b and rear left non-drive wheel 238b may be representative of a front right drive wheel and a front right non-drive wheel that would be coupled to front right tread 222, respectively. Moreover, front left drive wheel 236a and front left non-drive wheel 238a may be representative of a rear right drive wheel and a rear right non-drive wheel that would be coupled to rear right tread 226, respectively. In some embodiments, supporting wheel structures, such as 238a and 238b, may also be coupled to additional tread drives.

In some embodiments, the wheel portions of front tread drive 232 and rear tread drive 234, such as front left drive wheel 236a and rear left drive wheel 236b, include protrusions 236', such as sprockets 236" and/or claws 236''', to grip sections of treads 222, 224, 226, and 228 to cause the corresponding treads to wind around the wheel portions. Supporting wheel structures, such as non-drive wheels 238a and 238b, may also include such protrusions 236'. In some embodiments, such protrusions grip treads 222, 224, 226, and 228 at perforations and/or indentations on the interior surface of the treads. Treads 222, 224, 226, and 228 may be a single continuous band, such as a belt of multiple link plates that couple together by joint hinges to form a continuous track of link plates. In some embodiments, treads 222, 224, 226, and 228 may include a combination of tread protrusions and/or grooves on the exterior surface set in various patterns in order to improve grip or traction with a surface.

In some embodiments, front tread drive 232 and rear tread drive 234 may comprise a motor arrangement comprising a motor and a gear drive for rotational movement of wheel portions. For example, the motor may be a DC motor, stepper motor, and/or servo motor. In some embodiments, the motor arrangement further comprises a transmission and gear arrangement. Each tread drive, such as front tread drive 232, may rotate wheel portions, such as front left drive wheel 236a or rear left drive wheel 236b, in a clockwise direction, counterclockwise direction, or any combination thereof to move the treads. In some embodiments, a tread drive, such as front tread drive 232, is configured to rotate wheel portions on each side of a tread portion, such as front tread portion 212, at different speeds.

In some embodiments, each tread drive is synchronously operated to simultaneously rotate treads 222, 224, 226, and 228 in order to propel multi-tread vehicle 200 in a forward and/or backward direction. The speed of 222, 224, 226, and 228 may be the same while advancing tread section 210 or different, for example, when turning tread section 210. Multi-tread vehicle 200 may be advanced in this way into interior 126 of wing 120 by advancing over and being supported by edges 125 of access port openings 124 by treads 222, 224, 226, and 228.

In some embodiments, front tread drive 232 is operable to independently control speeds and/or directions of front right tread 222 and front left tread 224. In some embodiments, rear tread drive 234 is operable to independent control speeds and/or directions of rear right tread 226 and rear left tread 228. rear tread drive 234 may control speeds of rear right tread 226 and rear left tread 228 independently from speeds controlled by front tread drive 232 for front right tread 222 and front left tread 224. In some embodiments, a motor arrangement is located at different sides of respective thread portions and away from detachable tread coupling.

Figure 5A:
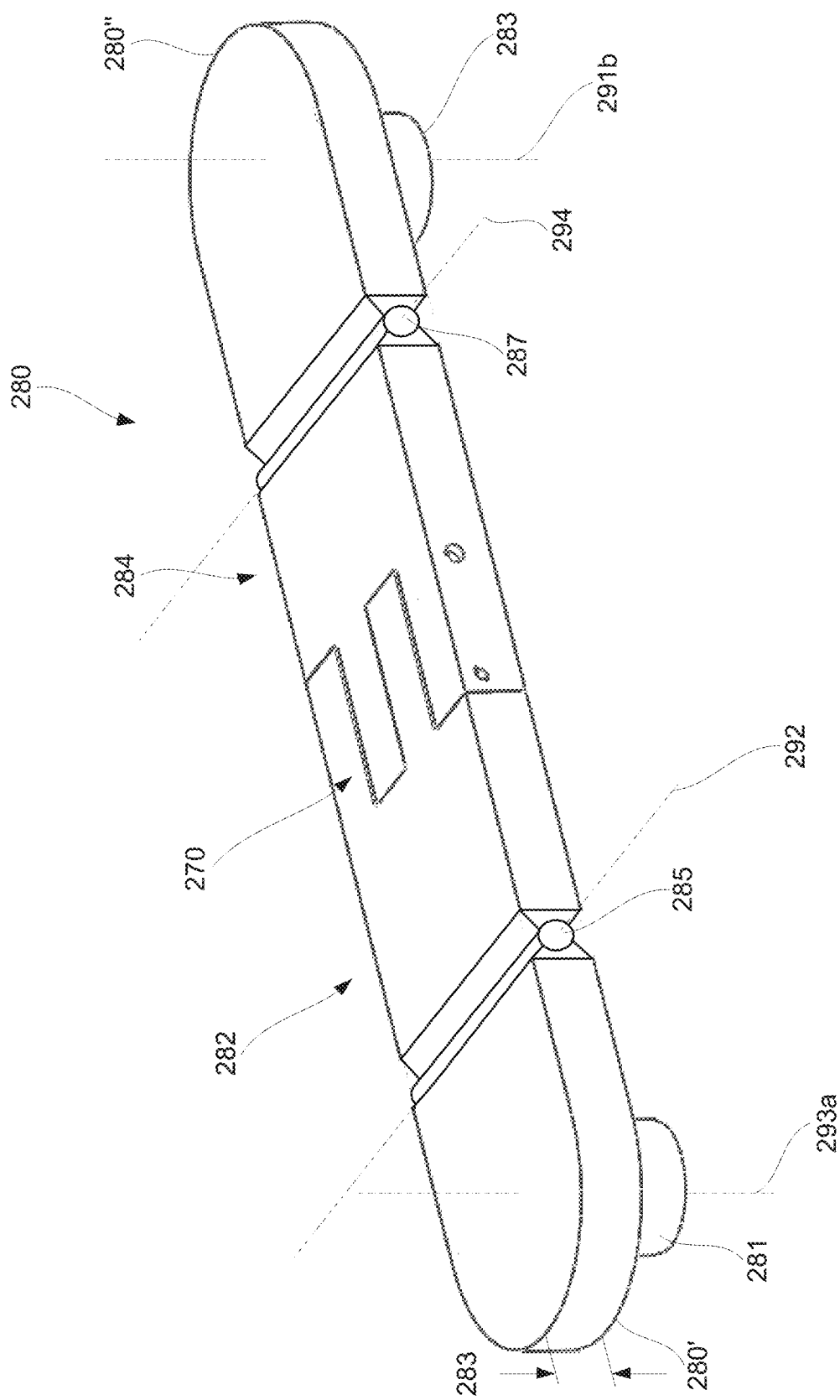
FIGS. 5A-5B are schematic views of a connector section of a multi-tread vehicle, in accordance with some embodiments.
Figure 5B:
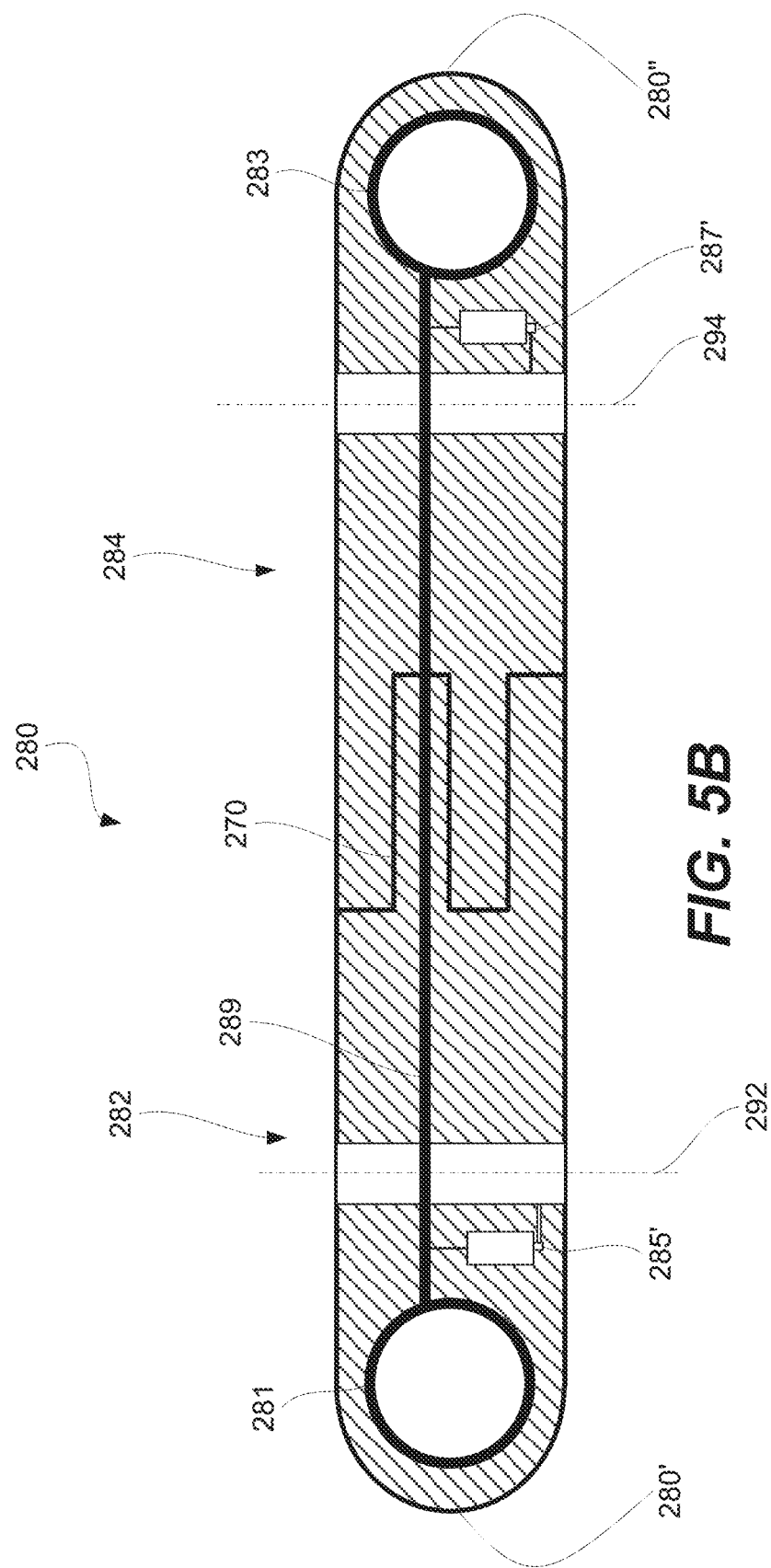

In various embodiments, connector section 280 couples to one or more tread sections, such as first tread section 210a and second tread section 210b as shown in FIGS. 2A and 2B. For example, connector section 280 may engage front tread pivot coupling 211 of second tread section 210b and/or rear tread pivot coupling 213 of first tread section 210a. Connector section 280 may include its own connector pivot coupling for such purposes, such as front connector pivot coupling 281 and/or rear connector pivot coupling 283. For example, as shown in FIGS. 5A and 5B, front connector pivot coupling 281 located at front end 280' of connector section 280 and may be engaged with rear tread pivot coupling 213 of first rear tread portion 214a, rear connector pivot coupling 283 at rear end 280" of connector section 280 may also be engaged with front tread pivot coupling 211 of second front tread portion 212b.

As depicted in FIG. 3B, tread section 210 may further include pivot drives, such as front pivot drive 242 and rear pivot drive 244. Front pivot drive 242 and/or rear pivot drive 244 may act on connector section 280 to cause pivot of connector section 280 about a corresponding pivot axis, such as first rear pivot axis 293a for and/or second front pivot axis 291b. For example, rear pivot drive 244 may be located on first rear tread portion 214a and cause connector section 280 to pivot relative to first rear tread portion 214a around first rear pivot axis 293a. As another example, front pivot drive 242 may be located on second front tread portion 212b and cause connector section 280 to pivot relative to second front tread portion 212b around second front pivot axis 291b. In some embodiments, such pivoting capability may provide greater mobility and compact folding of multi-tread vehicle as will be described in FIGS. 6A-6F.

In some embodiments, pivot drives 242 and/or 244 comprise a motor 242' and/or 244' and, in some instances, a gear drive for pivoting tread section 210 and/or connector section 280 relative to each other around an axis, such as axis 293a. For example, motor 242' and/or 244' may be a DC motor, stepper motor, and/or servo motor. In some embodiments, the motor arrangement further comprises a transmission mechanism and/or gear arrangement. In some embodiments, pivot drives, similar to drives 242 and/or 244, are positioned on connector section 280. If it is desirable to keep the size (e.g., thickness 283) of connector section 280 to the minimum, then drives 242 and/or 244 may be kept on tread section 210. Because tread section 210 necessarily includes treads and tread drives, it will typically be larger in size (e.g., have a greater thickness 283) than connector section 280 and may be more suitable for drives 242 and/or 244.

In some embodiments, front tread portion 212 and rear tread portion 214 are detachable units that are attached together (e.g., during some operation) by detachable tread coupling 230. Detachable tread coupling 230 may comprise front part and rear part, which belong to respective tread portions 212 and 214. At some point during operation, detachable tread coupling 230 may detach front tread portion 212 from rear tread portion 214, which may be used, for example, to retain one of these portions within interior 126 while removing the other portion. FIG. 3C depicts a single tread portion, such as rear tread portion 214 of multi-tread vehicle 200. In this view, rear tread portion 214 is decoupled from front tread portion 212.

As depicted in FIGS. 3B and 3C, a part of detachable tread coupling 230 of rear tread portion 214 may comprise a structure with two protrusions, inner protrusion 230-1 and outer protrusion 230-2, which may be viewed as a set of interdigitated and/or interlocking protrusions. Detachable tread coupling portion 230b may further include interlocking mechanism 235 and connectors 237 located on each protrusion. In some embodiments, a part of detachable tread coupling portion 230 corresponding to front tread portion 212 includes an identical configuration, including the inner protrusion and the outer protrusion. The two parts of detachable coupling portions 230 may hermaphroditically engage such that front tread portion 212 and rear tread portion 214 couple to form complete tread section 210, such as first tread section 210a or second tread section 210b. It should be noted that connectors 237 may also provide mechanical rigidity to detachable tread coupling 230. Furthermore, connectors may provide one or more electrical couplings between front tread portion 212 and rear tread portion 214 (e.g., for power transmission and/or electrical controls), one or more fiber optic couplings, one or more hydraulic couplings, and/or one or more pneumatic couplings.

As geometrically identical components, the protrusions of detachable tread coupling 230 on each tread portion 212 and 214 form hermaphrodic mating configuration 230' that includes simultaneous male component 230-1' and female component 230-1", involving complementary paired identical parts each containing both protrusions and cavities. Such mating surfaces can freely pair with any other, provided that the size and type are already matched. For example, as shown in FIGS. 2A-2B, first front right tread portion 212a is interlocked with first rear tread portion 214a, but can also interlock with any of second front tread portion 212b or second rear tread portion 214b, due to the hermaphroditic tread coupling portions. In other embodiments, detachable tread couplings 230a and/or 230b, may include more or fewer protrusions and/or cavities.

Figure 4A:
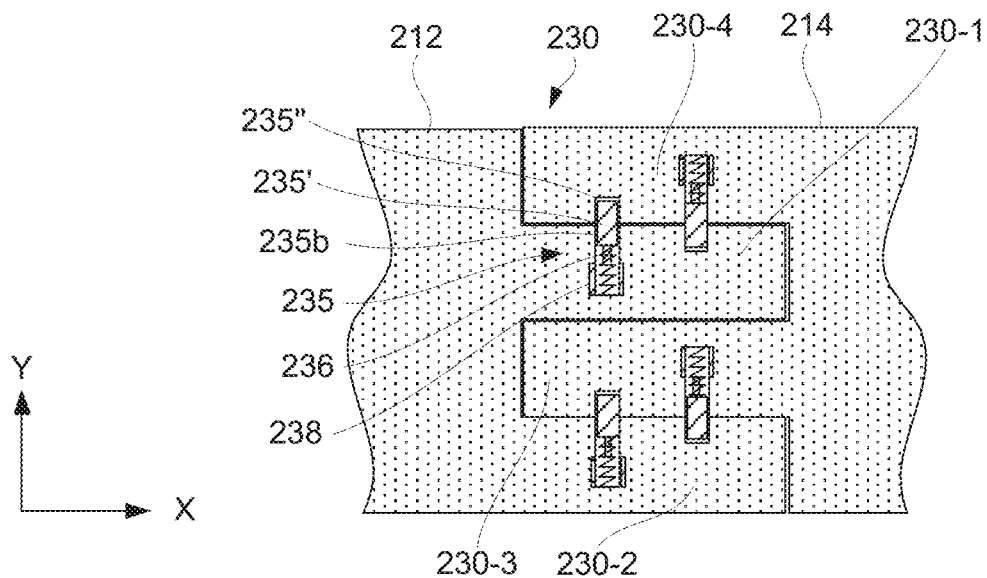
FIGS. 4A-4C are schematic cross-sectional views of a detachable tread coupling at different states, in accordance with some embodiments.

Referring to FIG. 4A, detachable coupling 230 engages and are secured in place by interlocking mechanisms 235 within each protrusion 230-1, 230-2, 230-3, and 230-4. Interlocking mechanisms 235 control one or more pins 235' along each protrusion that interconnect with one or more cavities 235" along an adjacent protrusion. For example, detachable tread coupling 230 may include one pin 235' at the interior side of the tip of each protrusion. Inner protrusions 230-1 and 230-3 may include corresponding cavities 235" on each side at the base. Once the parts of detachable tread coupling 230a have been paired together, pins 235' on each protrusion fit into corresponding cavities 235" of each inner protrusion, causing front tread portion 212 and rear tread portion 214 to lock together securely. Alternative mechanical mechanisms and configurations may be implemented to secure the tread portions, as described in FIGS. 4A-4C.

In various embodiments, tread coupling 230 allows for modular assembly and disassembly of multi-tread vehicle 200. During operation, portions of the multi-tread vehicle 200 can be assembled and/or disassembled (e.g., using control instructions) in a confined space, such as a wing bay compartment of interior 126 of wing 120. It should be noted that detachable connector couplings 270 and/or detachable tread couplings 230 can be actuated remotely. For example, one of these couplings may be decoupled while multi-tread vehicle 200 is deployed in its operating environment to remove only a portion of multi-tread vehicle 200 from that environment while retaining the remaining portion in the environment. In some embodiments, certain portions of multi-tread vehicle 200 may be disassembled in case of failures or malfunctions of certain components, allowing for multi-tread vehicle 200 to be serviceable inside an aircraft wing, such as wing 120 and 121.

Figure 4B:
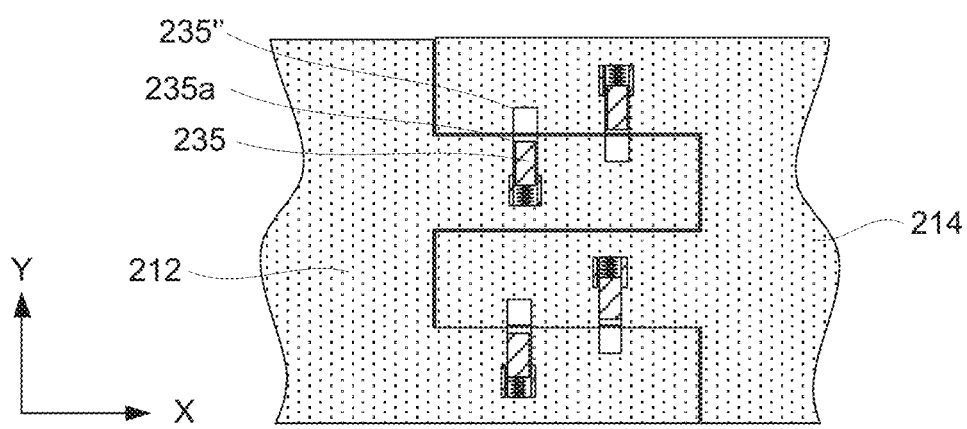
Figure 4C:
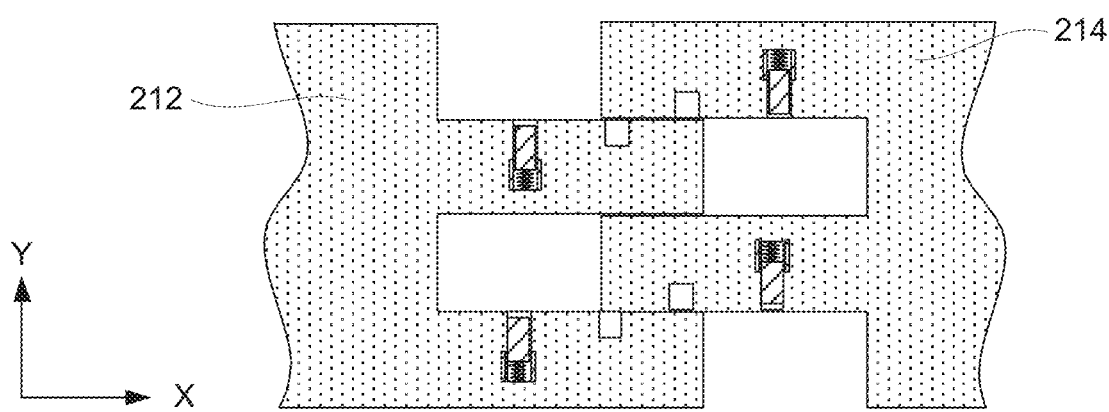

FIGS. 4A-4C are schematic cross-sectional views of detachable tread coupling 230 at different states, in accordance with some embodiments. Examples of different configurations of pins 235' and cavities 235" controlled by interlocking mechanisms 235 are illustrated. As depicted in FIGS. 4A-4C, each protrusion (230-1, 230-2, 230-3, and 230-4) includes a pin 235' located toward the base and a cavity 235" located toward the tip. Each pin 235' and cavity 235" are positioned such that one pin 235' is directly aligned with corresponding cavity 235" when front tread portion 212 is fully paired with rear tread portion 214 as shown in FIGS. 4A and 4B. Each pin 235' is controlled by one interlocking mechanism 235 including spring 236 and actuator 238. FIG. 4A shows front tread portion 212 and rear tread portion 214 fully paired and interlocked with springs 236 fully extended causing pins 235' to be inserted and secured within cavities 235". In various embodiments, the pins restrain the coupled tread portions and resist sheer forces in directions of the X and Z axes. The pins additionally prevent rotational flex about the Y-axis. In other embodiments, multi-tread vehicle 200 may include other support structures to increase the rigidness and stiffness at detachable tread coupling 230. FIG. 4B shows front tread portion 212 and rear tread portion 214 paired, but not fully interlocked with springs 236 retracted and pins 235' not inserted within cavities 235". FIG. 4C shows the partial pairing of hermaphroditic coupling protrusions of detachable tread couplings 230a and 230b.

In some embodiments, interlocking mechanisms 235 are electronically and/or wirelessly controlled. In some embodiments, interlocking mechanisms 235 are remotely controlled by an external user device. The control may be through other sections of multi-tread vehicle 200 extending to the access opening or some other means (e.g., a tether), wireless communication link, and the like. As such, when a portion of multi-tread vehicle 200 needs to be removed from the operating environment (e.g., to replace with another section, repair, maintenance, or simply upon completing of the operation). This features allows very efficient use of multi-tread vehicle 200 in spaces with limited access ports. For example, pins 235' may begin in a retracted state 235a and are caused to extend by interlocking mechanisms 235 once the pins 235' are aligned with the corresponding cavities 235" thereby moving into protracted state 235b. As previously described, electrical power and/or control signals, fiber optic control signals, pneumatic power and/or control signals, and hydraulic power and/or control signals for such operations may be supplied through connectors 237. In another example, interlocking mechanisms 235 cause pins 235' to retract until aligned with the corresponding cavities 235", at which point, interlocking mechanisms 235 cause pins 235' to insert into aligned cavities 235". In some embodiments, first detachable tread coupling 230a and second detachable tread coupling 230b are remotely controlled using, for example, a wire linkage 289 of connector section 280 that is electrically coupled to an connector 237 (further described in FIG. 5B). In some embodiments, pins 235' may alternatively, and/or additionally, function as power and data transfer mechanisms similar to l connectors 237. In some embodiments, detachable couplings 230 and/or 270 may be actuated mechanically, e.g., by an operator when multi-tread vehicle 200 is accessible, by another multi-tread vehicle 200 in the same operating environment, and/or even by an end effector of the same multi-tread vehicle 200.

In various embodiments, connectors 237 at each protrusion allow electrical, pneumatic, and/or hydraulic signals and/or power and/or fiber optic signals to be passed continuously along through each connected tread portions. In some embodiments, each connector 237 forms a male connector 237a that inserts into a corresponding male receiver socket 237b at the base of the protrusions, forming a male-female connector configuration. Providing two connectors 237 on tread coupling 230 may provide redundancy in case of failure or malfunction of one connector 237.

The electrical pneumatic, and/or hydraulic connection formed by connectors 237 may power interlocking mechanisms 235 as well as supply various control signals. For example, the successful insertion of connectors 237 into corresponding receiver sockets may allow flow of electrical pneumatic, and/or hydraulic power to signal interlocking mechanisms 235 to cause pins 235' to insert into aligned cavities 235". The electrical pneumatic, and/or hydraulic connection formed by connectors 237 may also provide power to control various mechanisms, such as rotation of tread drives (such as 232 and 234), pivot drives (such as 242 and 244), as well as other mechanisms further described below. In other embodiments, connectors 237 may additionally include optical fibers for data transfer.

Examples of Connection Sections

FIGS. 5A-5B are schematic views of connector section 280 of multi-tread vehicle 200, in accordance with some embodiments. As depicted, connector section 280 comprises front connector portion 282 and rear connector portion 284. Front connector portion 282 comprises a part of detachable connector coupling 270, front end 280', front connector pivot coupling 281, and front connector bend coupling 285, rear connector portion 284 including another part of detachable connector coupling 270, rear end 280", rear connector pivot coupling 283, and rear connector bend coupling 287.

Similar to tread portions 212 and 214, front connector portion 282 and rear connector portion 284 may be identical in geometry and configuration. As depicted in FIGS. 5A and 5B, front connector portion 282 and rear connector portion 284 are identical structures rotated 180 degrees relative to one another. In some embodiments, front connector portion 282 is detachably coupled to rear connector portion 284 using detachable connector coupling 270. Parts of detachable connector coupling 270 may form hermaphroditic coupling structures similar to parts of tread coupling 230, and may include interlocking mechanisms similar to interlocking mechanisms 235, described in FIGS. 4A-4C. Similar to some embodiments of tread section 210, detachable connector coupling 270 allow for assembly and disassembly of multi-tread vehicle 200 for purposes of repairing failures or malfunctions of certain components.

Various coupling portions of connector section 280 may provide mechanisms for mobility and maneuverability of multi-tread vehicle 200. Front connector pivot coupling 281 may be centered around first rear pivot axis 293a and couples to a rear tread pivot coupling, such as rear tread pivot coupling 213. Similarly, rear connector bend coupling 283 is centered around second front pivot axis 291b and couples to a front tread pivot coupling, such as front tread pivot coupling 211. As previously described, pivot drives, such as 242 and 244, act on connector pivot couplings, such as 281 and 283, to cause detachable connector section 280 to rotate about pivot axes, such as 291b and 293a.

Furthermore, front connector pivot coupling 281 of connector section 280 may be bendable at front connector bend coupling 285 relative to rear connector pivot coupling 283 of connector section 280 around front bend axis 292. Front connector pivot coupling 281 of connector section 280 may be further bendable at rear connector bend coupling 287 relative to rear connector pivot coupling 283 around rear bend axis 294. In other words, connector section 280 may be bendable with respect to one or more axes.

In some embodiments, front connector bend drive 285' may cause bending of front end 280' relative to rear end 280" of connector section 280 around front bend axis 292. Similarly, rear connector bend drive 287' may cause bending of front end 280" relative to rear end 280' of connector section 280 around rear bend axis 294.

FIG. 5B depicts a cross-sectional schematic view of connector section 280 showing power (and/or signal) transmission linkage 289. As similar linkage may be provided in each of tread section 210 and coupled to transmission linkage 289 either directly or through pivot coupling or other types of couplings between connector section 280 and tread section 210. In other words, linkage 289 is a part of the overall power and/or signal line extending through multi-tread vehicle 200. In some embodiments, power transmission linkage 289 comprises a suitable wiring material with appropriate ratings for circuit voltage, temperature and environmental conditions (moisture, sunlight, oil, chemicals) in which they can be used, and maximum current. In some embodiments, power transmission linkage 289 comprises an electrical wire or other material coupled to connector section 280. For example, power transmission linkage 289 comprises a conductive material embedded within connector section 280. In embodiments in which connector section 280 is detachable at connector coupling 270, power transmission linkage 289 may be separated at connector coupling 270 and continued through by one or more connectors, such as connectors 237. Power transmission linkage 289 may also run continuously through connector bend couplings 285 and 287.

In some embodiments, power transmission linkage 289 is interconnected to first tread section 210a and second tread section 210b, and electrically pneumatic, and/or hydraulic coupled to connectors 237 either directly (e.g., using a permanent connector) or through pivot coupling between tread sections 210 and connector section 280. It should be noted that even a direct connection to power transmission linkage 289 may allow tread sections 210 and connector section 280 to pivot with respect to each other when the connection uses, for example, a flexible line having a sufficient length allow for pivoting. At the same time, linkage 289 may be separable at detachable connector coupling 270. In some embodiments, tread portions 212 and 214 of tread section 210 also include a similar power transmission linkage connecting to connectors 237 to power various elements of tread section 210.

Power transmission linkage 289 may be responsible for transmitting electrical power and/or control signal from a power source through multi-tread vehicle 200 in order to power various elements on each tread and connector section, such as connector bend drives 285' and 287', tread drives 232 and 234, pivot drives 242 and 244, and interlocking mechanisms 235. In other embodiments, various other systems can be routed through each tread section 210 and connector section 280 of a multi-tread vehicle 200. For example, hoses can be routed through such that air can be pumped into the wing or sucked out. As another example, hydraulic lines can be routed through one or more tread sections 210 and connector sections 280. In other embodiments, power transmission linkage 289 may additionally include an optical fiber for data transfer. However, in some embodiments, the many joints created by the various couplings create an increased chance for failure or damage to various routed pipes, hoses, and/or lines. Thus, in some embodiments, it may be desirable to route only electrical power through electrical wiring and connectors 237 in order to power wireless devices, air pumps, or hydraulic pumps that have been transported into the wing.

Articulation Examples

FIGS. 6A-6C are schematic top views of multi-tread vehicle 200 during different folding states, in accordance with some embodiments. Specifically, FIG. 6A depicts multi-tread vehicle 200 in folded state 600. FIG. 6B depicts multi-tread vehicle 200 in partially folded state 605. Finally, FIG. 6C depicts multi-tread vehicle 200 in extended state 610. According to various embodiments, multi-tread vehicle 200 is foldable between folded state 600 and extended state 610. The folding of first tread section 210a, second tread section 210b, and connector section 280 is coordinated pivoting around first rear pivot axis 293a and around the second front pivot axis 291b. As previously described, such rotation may be controlled by one or more pivot drives located on tread section 210, such as front pivot drive 242 and rear pivot drive 244. The rotation of connector section 280 around first rear pivot axis 293a and second front pivot axis 291b may or may not be simultaneous.

In folded state 600 of certain embodiments, first front left tread 224a is disposed between first front right tread 222a and second front right tread 222b, as depicted in FIG. 6A. Furthermore, first front left tread 224a is adjacent to and parallel to second front right tread 222b. Similarly, first rear left tread 228a may be disposed between first rear right tread 226a and second rear right tread 226b. First rear left tread 228a may be adjacent and parallel to second rear right tread 226b.

In extended state 610, a plurality of treads may be collinearly aligned. For example, first front right tread 222a and second front right tread 222b may be collinear in extended state 610. Additionally, first rear right tread 226a and second rear right tread 226b may also be collinear with first front right tread 222a and second front right tread 222b. Finally, first front left tread 224a, second front left tread 224b, first rear left tread 228a, and second rear left tread 228b may all collinear in extended state 610 of multi-tread vehicle 200.

FIG. 6B depicts partially folded state 605 of multi-tread vehicle 200 illustrating transition from folded state 600 to extended state 610, or vice versa. As shown in FIG. 6B, multi-tread vehicle 200 may be caused to extend into extended state 610 from folded state 600 by the rotation of connector section 280 around first rear pivot axis 293a in the counterclockwise direction A and by the rotation of connector section 280 around second front pivot axis 291b in the counterclockwise direction A until first front right tread 222a and second front right tread 222b are collinear, as described above.

As further depicted in FIG. 6B, multi-tread vehicle 200 may be caused to fold into folded state 600 from extended state 610 by pivoting connector section 280 relative to tread sections 210a and 210b around first rear pivot axis 293a in the clockwise direction B and around second front pivot axis 291b in the clockwise direction B. Alternatively, and or additionally, connector section 280 may cause the folding of multi-tread vehicle 200 from extended state 610 by pivoting around first rear pivot axis 293a and second front pivot axis 291b in the counterclockwise direction A. In such an embodiment, multi-tread vehicle will be folded such that second front left tread 224b is disposed between second front right tread 222b and first front right tread 222a (not shown). Furthermore, in such this example of folded state 600, second front left tread 224b is adjacent to and parallel to first front right tread 222a.

Figure 6D:
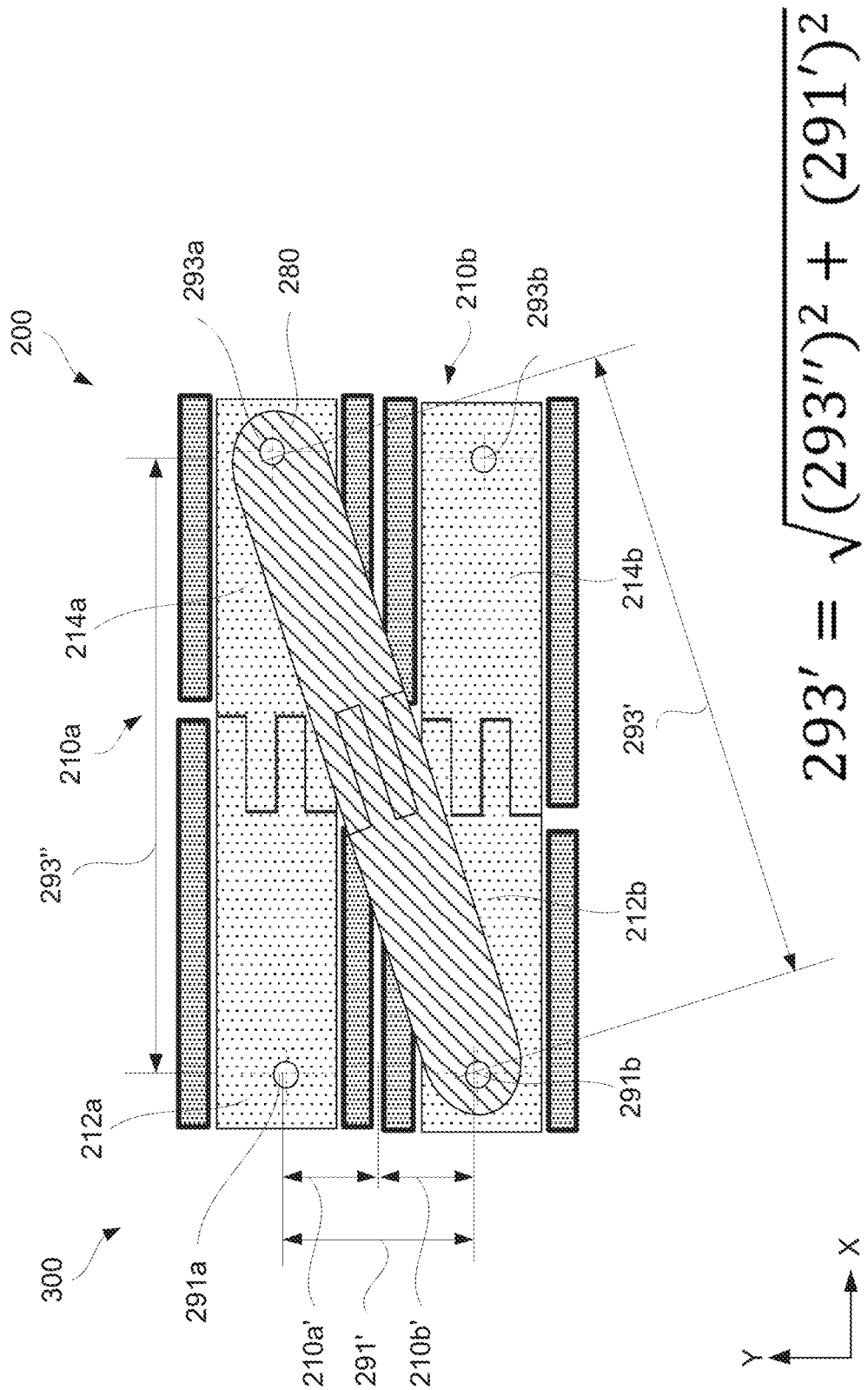
FIG. 6D is a schematic top view of a multi-tread vehicle in the folded state showing different lengths between pivot axes, in accordance with some embodiments.

FIG. 6D is a schematic top view of multi-tread vehicle in folded state 600 showing different dimensions, in accordance with some embodiments. As previously described, first front portion 212a may include first front pivot axis 291a and first rear portion 214a may include first rear pivot axis 293a. Furthermore, second front tread portion 212b may include second front pivot axis 291b and second rear portion 214b may include second rear pivot axis 293b. In folded state 600, distance 293' between first rear pivot axis 293a and second front pivot axis 291b may be equal to the square root of the sum of the square of distance 293" between first front pivot axis 291a and first rear pivot axis 293a and square of distance 291' between first front pivot axis 291a and second front pivot axis 291b, as given by the following equation:

$$293' = \sqrt{(293'')^2 + (291')^2}$$

In some embodiments, distance 293' is equal to the distance between first front pivot axis 291a and second rear pivot axis 293b, and distance 291' between first front pivot axis 291a and second front pivot axis 291b is equal to a width of first tread section 210a. As depicted in FIG. 6D, distance 291' is equal to the combined distance of half-width 210a' and half width 210b', where half width 210a' represents half of the width of first tread section 210a from its center to the outer edge of first front left tread 224a, and half width 210b' represents half the width of second tread section 210*b* from its center to the outer edge of second front right tread 222*b*. In FIG. 6D, half width 210*a*' and half width 210*b*' may be equal in measurement. This configuration may cause first front left tread 224*a* to rest flush against the adjacent second front right tread 222*b* when multi-tread vehicle 200 is in folded state 600. In other embodiments, there may be a gap of varying size first front left tread 224*a* and second front right tread 222*b* when multi-tread vehicle 200 is in folded state 600. In some embodiments, the widths of all tread sections, including first tread section 210*a* and second tread section 210*b*, are equal in measurement. In other embodiments, the width of tread sections, such as 210*a* and tread section 210*b*, may vary.

In various embodiments, it may be desirable for the length of a tread section, such as first tread section 210*a*, to be at least greater than the distance between supporting structures. With such a configuration, multi-tread vehicle 200 including first tread section 210*a* and second tread section 210*b* coupled by a connector section 280 traveling through an opening 124 along interior operating paths space 126*b* within a wing 120 may be supported by the lower edge 125 of at least two ribs 122, and at most four ribs 122, at all times. In an example, a wing bay compartment of interior 126 may be approximately 2 feet from rib to rib, such as from rib 122*a* to rib 122*b*. The length of a tread section 210*a* may be approximately 30 inches long in order to span from rib 122*a* to rib 122*b*. In another example, the width of a tread section 210 may be approximately 12 inches and the height of multi-tread vehicle may be approximately 6 inches high. In some embodiments, tread section 210 may be shorter than the distance of between supporting structure and may be supported by other tread sections 210 (through connector section 280) that contact supporting structures.

In various embodiments, it may be desirable to achieve the smallest rectangular profile as possible for multi-tread vehicle 200, taking into account the size of tools and other components to be carried into wing 120 by multi-tread vehicle 200, in order to limit the size of openings 124 and ports leading into interior 126 of wings 120 and/or 121. It may be desirable for tread section 210 to be as narrow as possible in width and a short as possible in height. Smaller openings 124 may result in more structurally sound support structures such as ribs 122. In other embodiments, multi-tread vehicle 200 is sized to fit within openings 124 and along wing bay compartment of interior 126, which may vary in length and size among various embodiments.

Figures 6E, 6F:
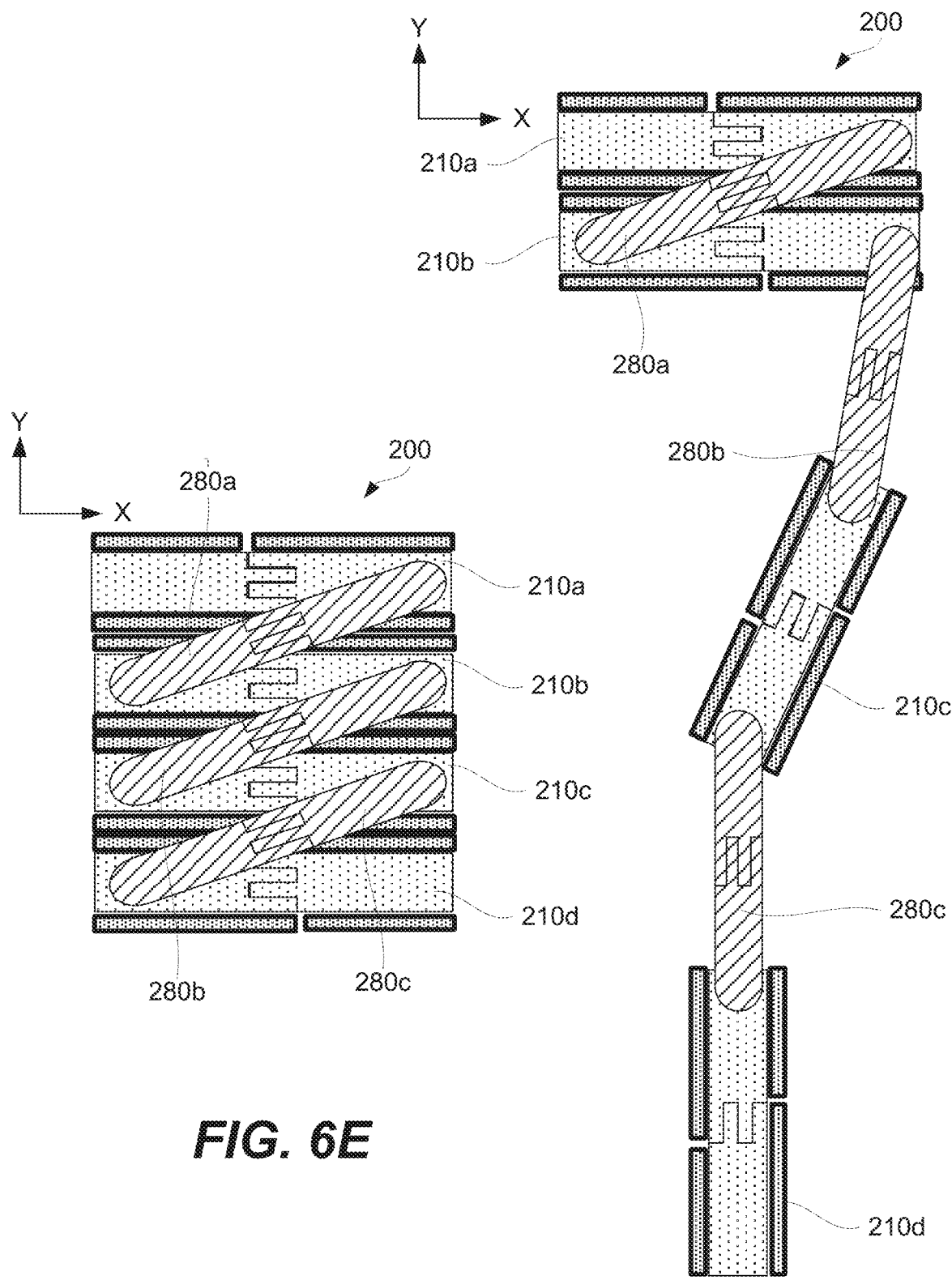
FIGS. 6E-6F are schematic top views of a multi-tread vehicle having multiple tread and connector sections, in accordance with some embodiments.

FIGS. 6E and 6F are schematic top views of a multi-tread vehicle having multiple tread and connector sections, in accordance with some embodiments. Additional tread sections 210, such as tread sections 210*c* and 210*d*, may be coupled to multi-tread vehicle 200 with additional connector sections 280, such as connector sections 280*b* and 280*c*. In some embodiments, tread sections 210*a*, 210*b*, 210*c*, and 210*d* are identical units. In some embodiments, connector sections 280*a*, 280*b*, and 280*c* are identical units. As shown in FIGS. 6E and 6F, multi-tread vehicle 200 includes first tread section 210*a* coupled to second tread section 210*b* by a first connector section 280*a*, third tread section 210*c* coupled to second tread section 210*b* by second connector section 280*b*, and fourth tread section 210*d* coupled to third tread section 210*c* by third connector section 280*c*, FIG. 6E depicts multi-tread vehicle 200 with additional tread sections 210 and connector sections 280 in a folded state 600. FIG. 6F depicts multi-tread vehicle 200 with additional tread sections 210 and connector sections 280 in a partially folded state 605, with first tread section 210*a* and second tread section 210*b* completely folded and tread sections 210*c* and 210*d* partially extended.

In some embodiments, the folding of multi-tread vehicle 200 provides for compact storage of multi-tread vehicle 200. In some embodiments, wing 120 or 121 of aircraft 100 may be as long as 200 feet or more. A multi-tread vehicle 200 may comprise enough tread sections 210 and connector section 280 to span the entire length of wing 120 or 121. Without such folding capabilities, would take a significant amount of space to store such a long multi-tread vehicle 200, and even more space to operate a non-folding multi-tread vehicle 200 in conjunction with wing 120 and/or 121.

Figure 7A:
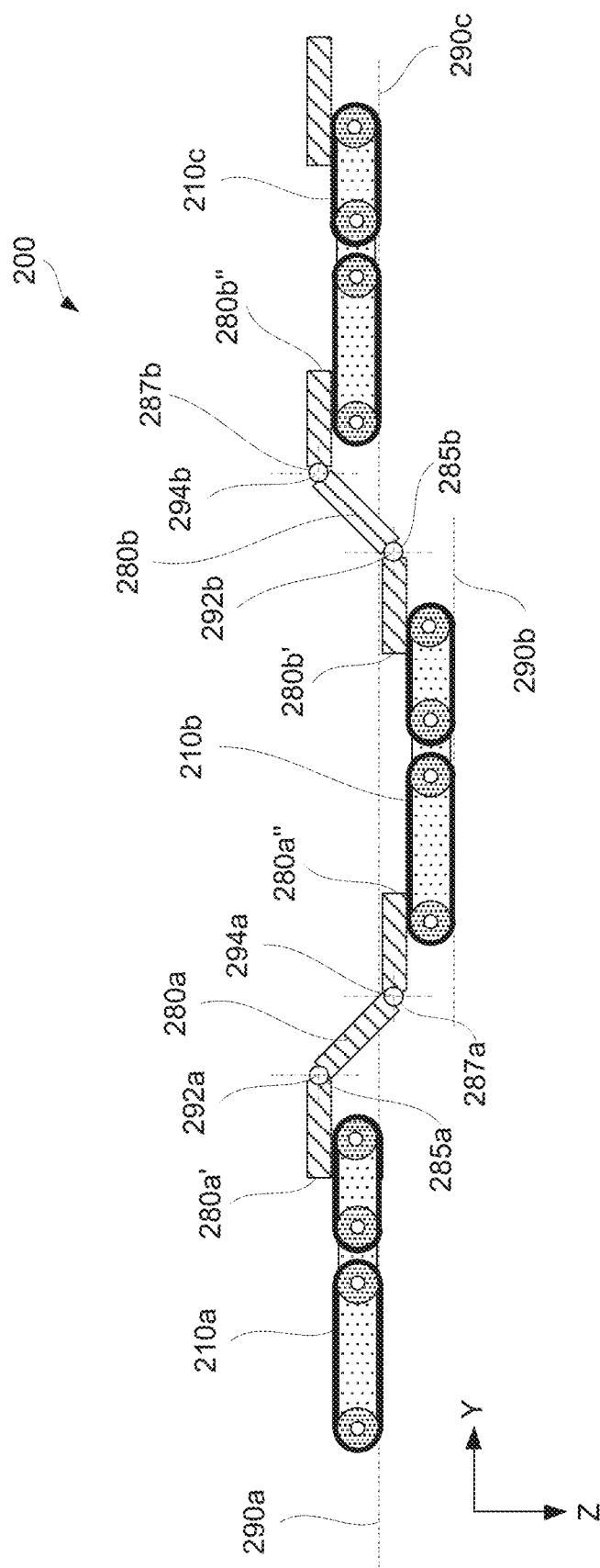

FIG. 7A is a schematic side view of multi-tread vehicle 200 showing bending of connector sections 280 of multi-tread vehicle 200, in accordance with some embodiments. FIG. 7A depicts a multi-tread vehicle 200 with first connector section 280*a* coupled to first tread section 210*a* and second tread section 210*b*, and second connector section 280*b* coupled to second tread section 210*b* and third tread section 210*c*. Connector sections 280*a* and 280*b* are examples of connector section 280 previously detailed in FIGS. 5A-5B. In the present example, first connector section 280*a* includes a front end 280*a*', a rear end 280*a*", front connector bend coupling 285*a*, rear connector bend coupling 287*a*, front bend axis 292*a*, rear bend axis 294*a*. Additionally, second connector section 280*b* includes front end 280*b*', rear end 280*b*", front connector bend coupling 285*b*, rear connector bend coupling 287*b*, second front bend axis 292*b*, and second rear bend axis 294*b*. A first plane 290*a* may be defined by first rear right tread 226*a* and first rear left tread 228*a* of first tread section 210*a*, as previously described in FIGS. 2A-2B. A second plane 290*b* may be similarly defined by second front right tread 222*b* and second front left tread 224*b* of second tread section 210*b*, as previously described. Additionally, a third plane 290*c* is similarly defined by the corresponding treads of third tread section 210*c* and is parallel to first plane 290*a* and second plane 290*b* as shown in FIG. 7A.

As previously described in FIG. 5A, in some embodiments, connector section 280, such as first connector section 280*a*, includes front connector bend coupling 285, such as front connector bend coupling 285*a*, centered around front bend axis 292, such as first front bend axis 292*a*, and rear connector bend coupling 287, such as rear connector bend coupling 287*a* centered around a rear bend axis, such as first rear bend axis 294*a*, at which connector section 280 and/or 280*a* may bend. In various embodiments, a front end 280*a*' of a connector section 280*a* can bend relative to rear end 280*a*" at front connector bend coupling 285*a*. In some embodiments, front bend axis 292*a* is parallel to plane 290*a*. Front end 280' of first connector section 280*a* may be further bendable relative to rear end 280*a*" of connector section 280*a* around rear bend axis 294*a*. In some embodiments, rear bend axis 294*a* is parallel to plane 290*a*.

Second connector 280*b* includes a similar configuration to first connector 280*a*. Second connector section 280*b* includes second front connector bend coupling 285*b* centered around second front bend axis 292*b*, and second rear connector bend coupling 287*b* centered around rear bend axis 294*b*, at which second connector section 280*b* may bend. In various embodiments, front end 280*b*' of connector section 280*b* can bend relative to rear end 280*b*" at front connector bend coupling 285*b*. In some embodiments, front bend axis 292*b* is parallel to plane 290*b*. Front end 280*b*' of second connector section 280*b* may be further bendable relative to rear end 280*b*" of connector section 280*b* around a rear bend axis 294b. In some embodiments, rear bend axis 294b is parallel to plane 290b.

In various embodiments, first connector section 280a can be configured to allow bending at various angles of front end 280a' relative to rear end 280a" allowing planes 290a, 290b, and 290c to be configured at different angles relative to one another. In some embodiments, second connector section 280b is configured to have similar bending capabilities as first connector section 280a. In various embodiments, the bending of each connector section, 280a and 280b, around the various bend axes (292a, 294a, 292b, and 294b) allow the multi-tread vehicle 200 to achieve a staggered configuration of tread sections 210a, 210b, and 210c, as shown in FIG. 7A. As shown in FIG. 7A, the first plane 290a, second plane 290b, and third plane 290c are parallel. In some embodiments, bending of connector sections 280a and 280b allows a tread section, such as second tread section 210b, to rest on the bottom surface of a wing bay compartment of a wing 120 for additional support and/or increase access for repairs and maintenance.

Bending of connector sections 280a and 280b may also allow folding of multi-tread vehicle 200 such that tread sections 210a, 210b, and 210c are stacked on the top of each other, as, for example, shown in FIG. 7B. This vertical stacking arrangement may be used during storage of multi-tread vehicle 200 detaching portions of connector sections 280a and 280b and/or tread sections 210a, 210b, and 210c. This vertical stacking may be used as an alternative or in addition to horizontal folding described above with reference to FIGS. 6A-6F.

Figure 7C:
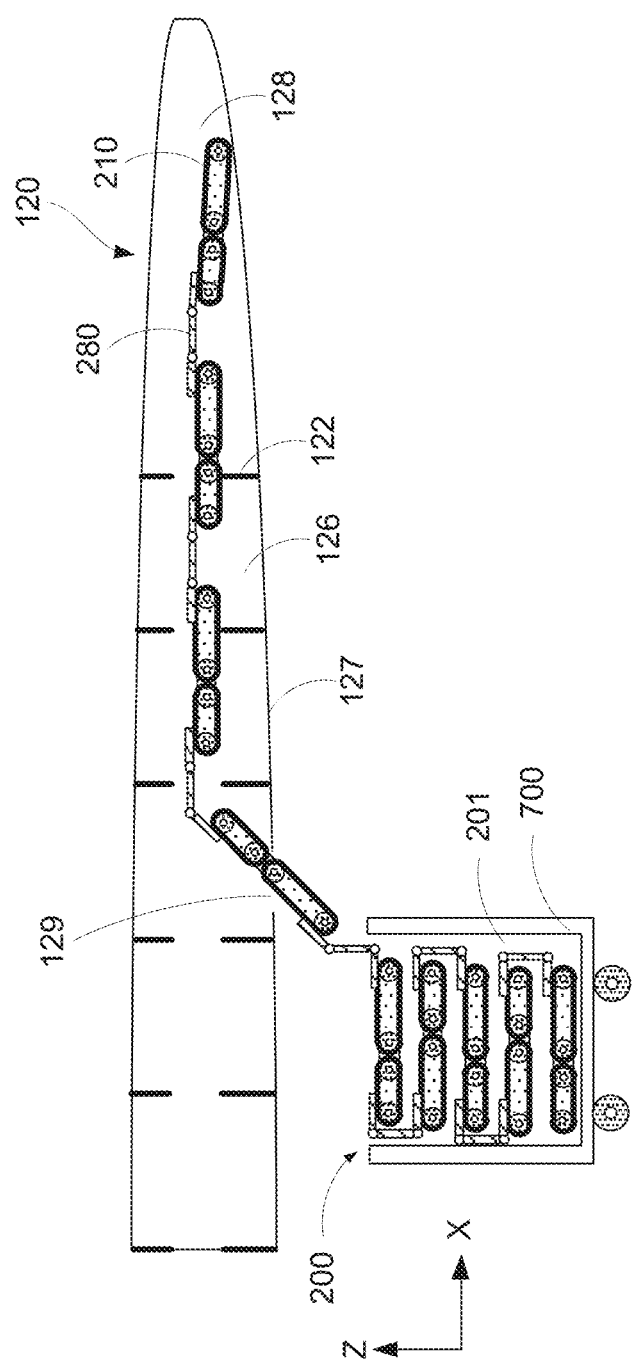
FIGS. 7C-7E are schematic illustrations of deployment of a multi-tread vehicle into a wing through a lower wing skin panel, in accordance with some embodiments.

Furthermore, bending of connector sections 280a and 280b may also allow folding of multi-tread vehicle 200 to be deployed through access ports that may be not be within the plane of the vehicle path. For example, as shown in FIG. 7C, multi-tread vehicle 200 may be deployed through lower wing skin panel 127 of wing 120 or, more specifically, through access port 129 within lower wing skin panel 127. As such, multi-tread vehicle 200 may not need to travel through entire width or length of wing 120 in, order for example, to reach the most remote portion of wing 120.

As shown in FIG. 7C, multi-tread vehicle 200 may be vertically stacked outside of wing 120. Stack 201 may be disposed within storage 700. During the deployment, storage 700 containing stack 201 formed by folded multi-tread vehicle 200 may be positioned next to access port 129 within lower wing skin panel 127. Multi-tread vehicle 200 may be unfolded section by section and deployed into interior 126 of wing 120. Multi-tread vehicle 200 may be unfolded into a planar orientation within wing 120 and extend in this planar orientation to operating zone 128 which may be remotely positioned from access port 129. The support to multi-tread vehicle 200 may be provided by ribs 122 or some other structures. It should be noted that bending of connector sections 280 may also allow tread sections 210 deviate from the planar orientation and, for example, to reach wing skin portion 127 as, for example, shown in FIG. 7C. This contact with wing skin portion 127 may be used for support, performing some operations on wing skin portion 127, and/or other purposes.

Figure 7D:
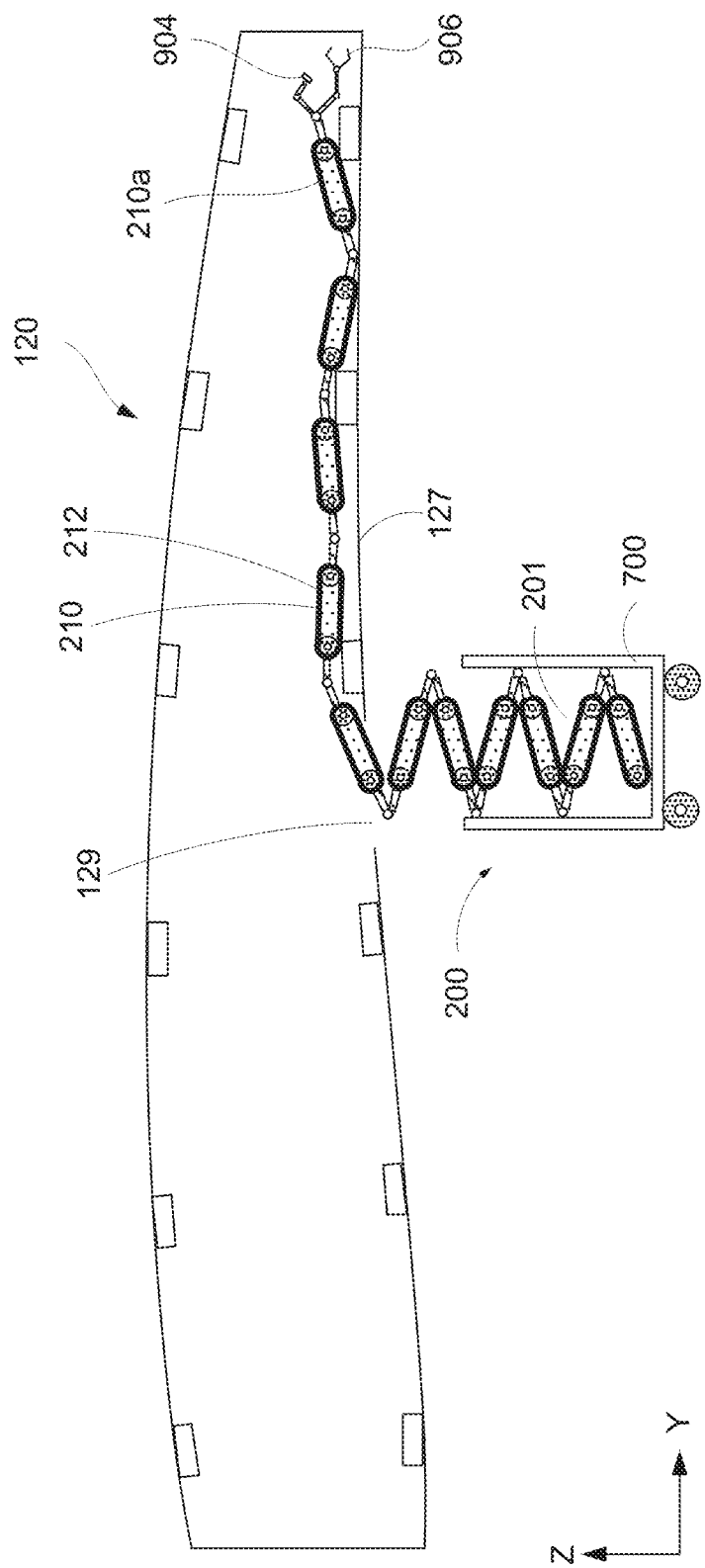

FIG. 7D illustrates another example of deploying multi-tread vehicle 200 through access port 129 within lower wing skin panel 127. In this example, multi-tread vehicle 200 includes two tread sections 210, each having only one tread portion 212. This configuration may be used to achieve more articulation since tread sections 210 may be more compact. Of course, using one tread portion may not allow for separating multi-tread vehicle 200 at tread sections 210. Instead connector sections 280 may be used for this purpose.

Furthermore, the deployment of multi-tread vehicle 200 in FIG. 7D is performed in a different direction (i.e., in the Y direction) within wing than the deployment direction presented in FIG. 7C. One having ordinary skill in the art would understand that multi-tread vehicle 200 may be deployed in any direction. FIG. 7C also illustrate tool 906 and sensor 904 (e.g., camera, microphone, and the like) supported by first connector section 280. Tool 906 and sensor 904 are further described below with reference to FIG. 9. It should be noted that tool 906 and/or sensor 904 may be connected directly to one section of multi-tread vehicle 200 or to an end effector.

Figure 7E:
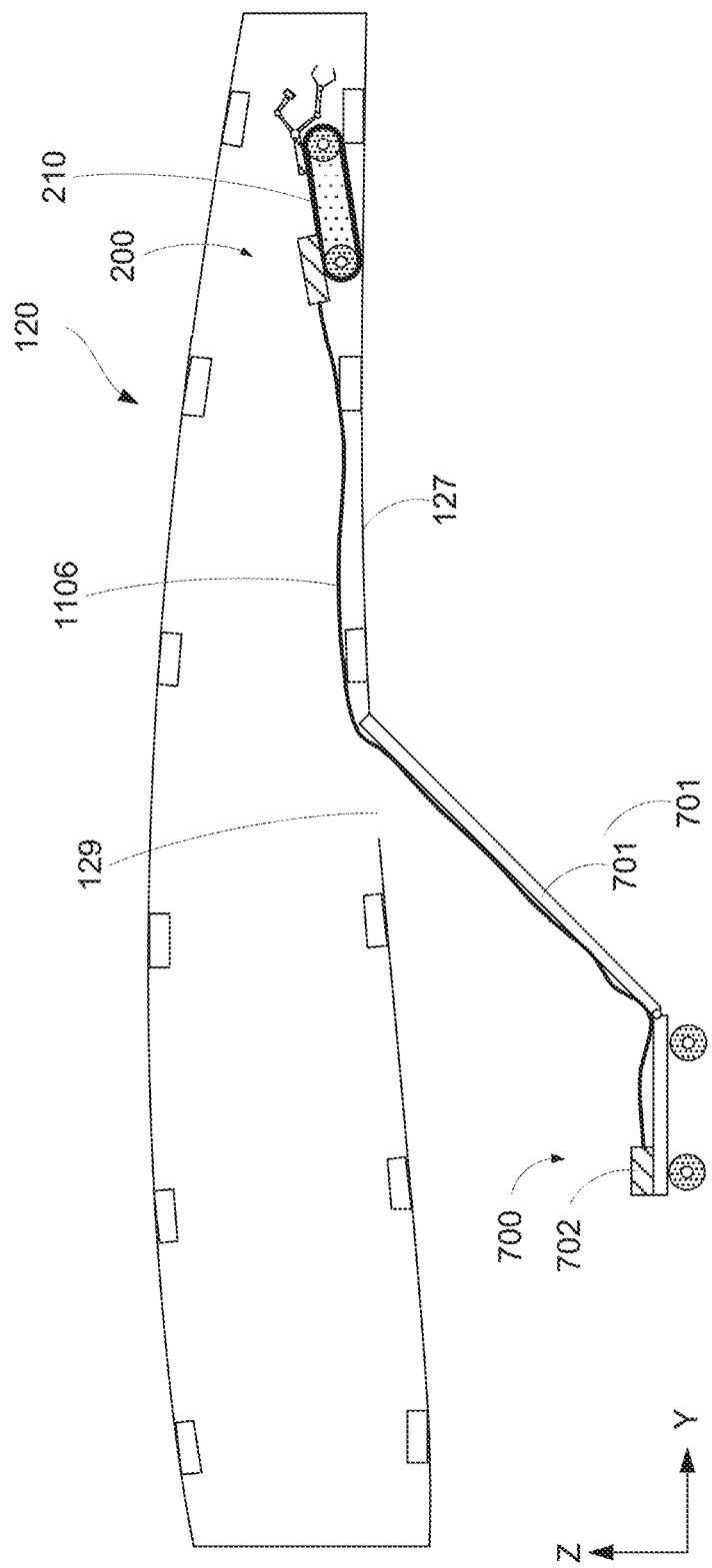

FIG. 7E illustrates yet another example of deploying multi-tread vehicle 200 through access port 129 within lower wing skin panel 127. In this example, multi-tread vehicle 200 include one tread section 210 connected by tether 1106 to base station 702 of storage 700. Examples of tether 1106 and operations using tether 1106 are described below with reference to FIG. 11. Base station 702 may be in turn connected to a system for controlling multi-tread vehicle 200. In this example, storage 700 may also include ramp 701 extending to access port 129 since tread section 210 does not have any other sections for support when reaching access port 129.

In some embodiments, the materials used to manufacture multi-tread vehicle 200 provide stiffness and rigidness to tread sections, connector sections, and the corresponding couplings, allowing multi-tread vehicle 200 to span significant distances without sagging or compromising the parallel configuration of planes 290a, 290b, and 290c. This may allow multi-tread vehicle 200 to remain aligned with each opening 124. In some embodiments, gravity may cause the front end of multi-tread vehicle 200 to dip a certain amount, at which point multi-tread vehicle 200 may rely on rotation of the treads to climb over an edge 125 of an opening 124. There may be instances in which a multi-tread vehicle dips to a certain degree that it becomes misaligned with an opening 124. Bending of connector sections 280a and 280b may allow upward and downward adjustments to ensure that tread sections 210a, 210b, and 210c align with openings 124 as the multi-tread vehicle 200 travels through interior operating paths 126a, 126b, or 126c.

FIGS. 8A and 8B are schematic top and side views of a multi-tread vehicle showing a combination of bending and pivoting, in accordance with some embodiments. An alternative configuration of tread sections and connector sections are depicted in FIGS. 8A-8B. First tread section 210a is coupled to second tread section 210b by first connector section 280a. Third tread section 210c is coupled to second tread section 210b by second connector section 280b. Fourth tread section 210d is coupled to third tread section 210c by third connector section 280c.

First plane 290a is defined by support points of the treads on first tread section 210a, as previously described in FIGS. 2A-2B. A portion of first plane 290a is outlined by a dashed line in FIG. 8A. The bottom surfaces of treads on each of the other tread sections similarly define the other corresponding planes 290b, 290c, and 290d. Second plane 290b is defined by the support points of the treads on second tread section 210b. Third plane 290c is defined by the support points of the treads on third tread section 210c. Fourth plane 290d is defined by the support points of the treads on fourth tread section 210d. First connector section 280a rotates about a first pivot axis 291a perpendicular to first plane 290a, and bends about a first bend axis 292a parallel to first plane 290*a*. Second connector section 280*b* rotates about a second pivot axis 291*b* perpendicular to second plane 290*b*, and bends about a second bend axis 292*b* parallel to second plane 290*b*. Third connector section 280*c* rotates about a third pivot axis 291*c* perpendicular to third plane 290*c*, and bends about a third bend axis 292*c* parallel to third plane 290*c*.

In FIGS. 8A-8B, first tread section 210*a* and first plane 290*a* are positioned horizontally in parallel to a plane defined by the X and Y axes. First connector section 280*a* is bent about first bend axis 292*a* in direction F such that second tread section 210*b* and second plane 290*b* are diagonal and angled downward relative to first tread section 210*a* and first plane 290*a*. Second connector section 280*b* is further bent around second bend axis 292*b* in direction E such that third tread section 210*c* and third plane 290*c* are angled upward relative to second tread section 210*b* and second plane 290*b*. As shown in FIG. 8B, third tread section 210*c* and third plane 290*c* are positioned horizontally in parallel to first plane 290*a* and a plane defined by the X and Y axes. Third connector section 280*c* is not bent about third bend axis 292*c* so that fourth tread section 210*d* and fourth plane 290*d* are also parallel to first plane 290*a* and a plane defined by the X and Y axes.

As shown in FIG. 8A, first tread section 210*a* and second tread section 210*b* are aligned along the Y-axis. Second connector section 280*b* is further rotated about second pivot axis 291*b* in direction D such that third tread section 210*c* is angled relative to first tread section 210*a* and second tread section 210*b*. Third connector section 280*c* is also rotated about third pivot axis 291*c* in direction C such that fourth tread section 210*d* is angled relative to third tread section 210*c* and parallel to first tread section 210*a* and second tread section 210*b*. In certain embodiments, such maneuverability about pivot axes and bend axes allow multi-tread vehicle 200 to access multiple surfaces within a wing bay compartment within interior 126 of wing 120.

Depending on the number of different articulations, multi-tread vehicle 200 may be used as a highly-articulated end-effector arm, which may or may not be attached to another multi-tread vehicle 200. For example, first multi-tread vehicle 200 may have sections that are smaller in size and have more articulation options than second multi-tread vehicle 200. Second multi-tread vehicle 200 may be used as a carrier/transport for first multi-tread vehicle 200, which in turn is used to perform various functions within an operating environment, either directly or through a set of sensors and manipulators.

Examples of Sensors and Tools

Figure 9:
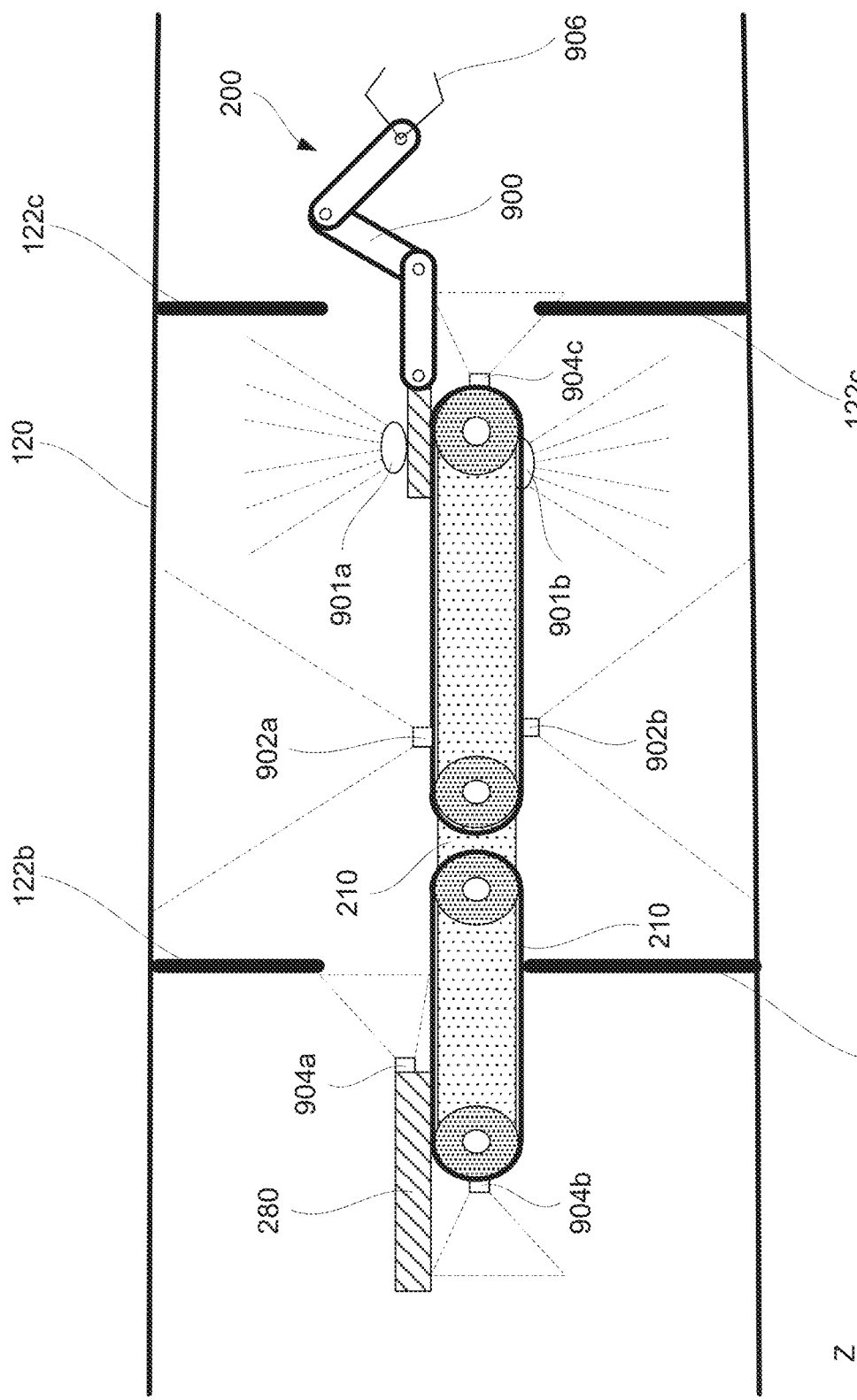
FIG. 9 is a schematic side view of a multi-tread vehicle showing different sensors, cameras, and lights of the vehicle, in accordance with some embodiments.

FIG. 9 is a schematic side view of multi-tread vehicle 200 showing different sensors, cameras, and lights of multi-tread vehicle 200, in accordance with some embodiments. In various embodiments, multi-tread vehicle 200 further comprises proximity sensors, cameras, lights, and other components to enable navigation through interior 126 of wings 120 and 121. FIG. 9 depicts a longitudinal cross-section of a wing 120 from the C-C viewpoint (identified in FIG. 1A) corresponding to the longitudinal Y-axis, as described in FIGS. 1A-1C. FIG. 9 further shows a multi-tread vehicle 200 traveling through openings 124 of ribs 122*b* and 122*c* and supported by the lower edge 125 of rib 122*b*. Tread section 210 may be coupled to other tread sections, such as tread section 210*b* and 210*c* by first connector section 280*a* and second connector section 280*b*. In some embodiments, multi-tread vehicle 200 includes light 901*a* located on the top surface of first connector section 280*a* and light 901*b* located on bottom surface of tread section 210. Multi-tread vehicle further includes camera 902*a* located on the top surface of tread section 210 and camera 902*b* located on the bottom surface of tread section 210. Multi-tread vehicle 200 further includes sensor 904*a* located on second connector section 280*b*, and sensors 904*b* and 904*c* located on tread section 210. In various embodiments, such components may be located on different portions of multi-tread vehicle 200. In other embodiments, a multi-tread vehicle 200 may include more or fewer instances of the components as shown in FIG. 9.

In various embodiments, cameras 902*a* and 902*b* include any type of video or image capturing device that captures images and/or video. In some embodiments, the video may be a streaming real-time video feed. Such devices may include geometrically-correct stereoscopic camera pairs that provide depth perception and/or binocular stereopsis. Images capture by cameras 902*a* and 902*b* are used in navigating multi-tread vehicle 200 through various openings 124 in ribs 122. For example, captured images may show that multi-tread vehicle 200 may not be positioned adequately to enter into an approaching opening 124 because it is too low. In other embodiments, images captured by cameras 902*a* and 902*b* are used to visually inspect interior space 126 and/or various objects within interior space 126 of wing 120. Captured images may also be used to visually identify malfunctions of multi-tread vehicle 200. In some embodiments, capture images may be used to visually identify malfunctions of a separate multi-tread vehicle 200.

In some embodiments, cameras 902*a* and 902*b* provide a wide angle view of interior 126. In other embodiments cameras 902*a* and 902*b* can be adjusted and directed to capture images from different locations. In some embodiments, lights 901*a* and 901*b* provide lighting for images captured by cameras 902*a* and 902*b*. In various embodiments, lights 901*a* and 901*b* may comprise various lighting sources, including but not limited to LED and halogen lights. In some embodiments, lights 901*a* and 901*b* can be adjusted to increase or decrease brightness, as well as positioned to focus light on particular areas of interest. In some embodiments, cameras and lights are positioned at tips of tread sections 210 and connector sections 280. In other embodiments, cameras and lights may be positioned at various other locations on multi-tread vehicle 200.

In various embodiments, sensors 904*a*, 904*b*, and 904*c* are proximity sensors that can detect the presence of nearby objects without any physical contact. In some embodiments, such proximity sensors may operate by emitting an electromagnetic field or a beam of electromagnetic radiation, such as infrared, in order to detect changes in the field or return signal. In other embodiments, other mechanisms may be implemented by sensors 904*a*, 904*b*, and 904*c*, such as laser rangefinders, passive optical, radar, sonar, etc. For example, sensor 904*c* may detect the proximity of multi-tread vehicle 200 to bottom edge 125 of rib 122*c*. If the proximity is too close, sensor 904*c* may activate a signal warning the operator of multi-tread vehicle 200. In another embodiment, sensor 904*c* may prohibit any additional movement that may cause multi-tread vehicle 200 to collide with rib 122*c*. In various embodiments, information captured by cameras and sensors are transmitted wirelessly to a user device and/or via optical fibers.

FIG. 9 also illustrates tool 906 for performing various operations. Some examples of tool 906 include, but are not limited, to a drill, a sealer, a brush, an punch, a wrench, and the like. Tool 906 may be operated either directly and/or by various manipulations of multi-tread vehicle 200.

FIG. 9 also illustrates end effector 900 of multi-tread vehicle 200, which may be attached to tread section 210 (as shown) or to connector sections 280. In some embodiments, end effector 900 is multi-tread vehicle 200 itself, which may have smaller tread sections and connector sections. End effector 900 may be more articulated than multi-tread vehicle 200 supporting this end effector 900. The supporting multi-tread vehicle 200 may be referred to as a delivery vehicle, transport vehicle, and the like. In some embodiments, end effector 900 includes sensors, manipulators, lights, and the like.

Processing Examples Of Using Multi-Tread Vehicles

Figure 10:
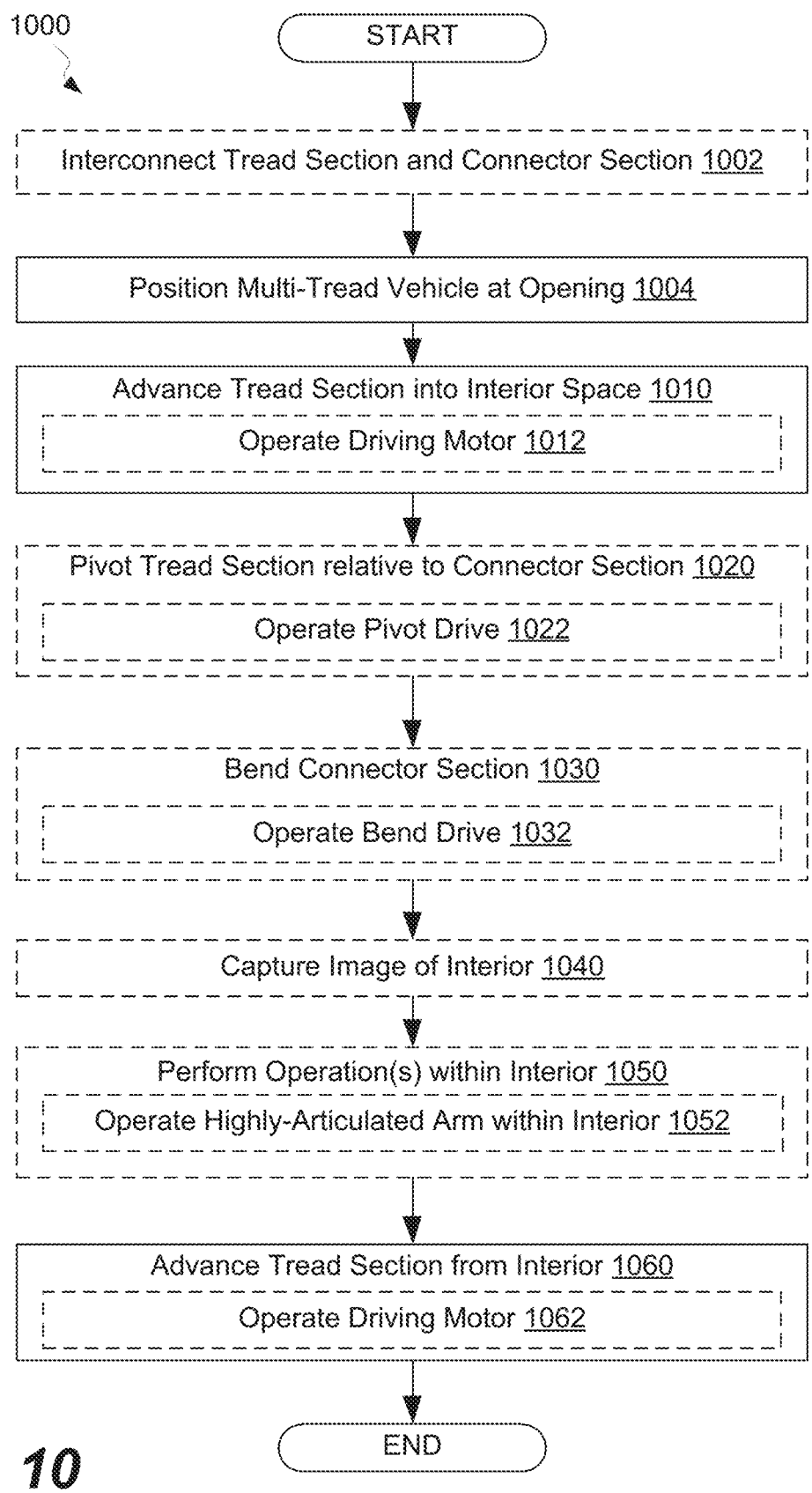
FIG. 10 is a process flowchart corresponding to a method for accessing an interior space using a multi-tread vehicle, in accordance with some embodiments.

FIG. 10 is a process flowchart corresponding to a method 1000 for accessing an interior space using a multi-tread vehicle, in accordance with some embodiments. In various embodiments, method 1000 is implemented to access interior 126 of aircraft 100 using multi-tread vehicle 200. Dashed lines within FIG. 10 indicate optional operations and/or components to method 1000.

At operation 1002, a tread section and a connector section are interconnected. As described in previous figures, in some embodiments, multi-tread vehicle 200 comprises first tread section 210a, second tread section 210b, and connector section 280 coupled to first rear tread portion 214a and to second front tread section 212b. In some embodiments, multi-tread vehicle 200 comprises additional tread sections and connector sections. In some embodiments, a front connector pivot coupling 281 is coupled to a rear tread pivot coupling 213 of a first rear tread portion 214a. Furthermore, a rear connector pivot coupling 283 is coupled to a front tread pivot coupling 211 of a second front tread portion 212b. In some embodiments, the interconnection of tread sections 210a and 210b with connector section 280 cause electrical power to be transported through the entire multi-tread vehicle 200 via power transmission linkages 289 and connectors 237, previously described in FIGS. 3A-3C and 5A-5B.

At operation 1004, multi-tread vehicle 200 is positioned at an opening 124 to interior space 126 of aircraft 100. In some embodiments, multi-tread vehicle 200 may access interior 126 through opening 124 into wing 120 located on bulkhead rib 122a at inboard end 120c of wing 120, however, other access ports are also within the scope. For example, the access port may be located within outboard end of wing, lower or upper wing skin panel, front or rear spar, and the like. In other embodiments, multi-tread vehicle 200 may access interior 126 through an opening 124 into wing 120 located at outboard end 120d of wing 120.

At operation 1010, first tread section 210a is advanced into interior space 126. In some embodiments, first tread section 210a may include various end effectors comprising sensors and/or manipulators (e.g., a highly articulated arm), which advanced first. In some embodiments, method 1000 comprises advancing at least first tread section 210a of multi-tread vehicle 200 into the opening 124 that multi-tread vehicle 200 was positioned to at operation 1004. Advancing tread section 210a into opening 124 may include operating a driving motor at operation 1012, such as front tread drive 232. In some embodiments, operation of front tread drive 232 causes rotation of first front right tread 222a and first front left tread 224a while first front right tread 222a and first front left tread 224a contact a portion of an edge 125 defining opening 124 of a rib, such as rib 122a. The contacting treads may then grip edge of rib 122a to propel multi-tread vehicle 200 into opening 124 and into interior 126 of wing 120. Multi-tread vehicle 200 may continue advancing along one or more ribs 122 along interior operating path 126c defined by one or more aligned openings 124 as described in FIG. 1C. operation 1010 may include additionally and/or alternatively operating rear tread drive 234 of first tread section 210a to cause rotation of first rear right tread 226a and first rear left tread 228a while first rear right tread 226a and first rear left tread 228a contact a portion of an edge 125. In some embodiments, operation 1010 includes additionally and/or alternatively operating front tread derive 232 and/or rear tread drive 234 of second tread section 210b.

In some embodiments, first tread section 210a and connector section 280 are collinear while advancing first tread section 210a. Second tread section 210b may also be collinear with first tread section 210a and connector section 280 while advancing first tread section 210a. In some embodiments, first tread section 210a is simultaneously supported by at least two edges 125 for at least a period of time while advancing first tread section 210a.

In some embodiments, multi-tread vehicle 200 is further advanced through one or more aligned openings in subsequent ribs, such as ribs 122b and 122c. As previously described, multi-tread vehicle 200 may be simultaneously supported by at least two edges 125 for at least a period of time while advancing into wing bay compartments through openings 124. For example, first tread section 210a and second tread section 210b may each be simultaneously supported by an edge 125 of two or more ribs. In some embodiments, multi-tread vehicle 200 may be advanced through openings 124 from inboard end 120c of wing 120 to outboard end 120d of wing 120, or vice versa.

At operation 1020, a tread section is pivoted relative to a connector section. In some embodiments, pivoting tread sections, such as 210a and/or 210b, at operation 1020 involves the pivoting motions described in FIGS. 8A-8B. For example, first tread section 210a is pivoted about first rear pivot axis 293a. In another example, second tread section 210b may be pivoted about second front pivot axis 291b. In some embodiments, pivoting first tread section 210a may be performed while both first tread section 210a and connector section 280 are positioned within interior space 126. Pivoting first tread section 210a and/or 210b may also be performed while any combination of the following are positioned within and/or outside interior 126: first tread section 210a, second tread section 210b, and connector section 280. In some embodiments, pivoting tread sections 210a and/or 210b includes operating a pivot drive, such as front pivot drive 242 or rear pivot drive 244 (as described in FIG. 3B), at operation 1022. In some embodiments, tread section 210a and/or tread section 210b may be pivoted relative to connector section 280 while advancing tread section 210a and/or tread section 210b into interior 126. In some embodiments, the pivoting of multi-tread vehicle 200 at operation 1020 enables multi-tread vehicle 200 to access various portions of a wing bay compartment of interior space 126.

At operation 1030, connector section 280 is bent. In some embodiments, bending connector section 280 at operation 1030 involves the bending motions described in FIGS. 8A-8B. For example, connector section 280 is bent about a bend axis, such as front bend axis 292 or rear bend axis 294. In some embodiments, bending connector section 280 may be performed while both first tread section 210a and connector section 280 are positioned within interior space 126.

In further embodiments, bending connector section 280 may be performed while any combination of the following are positioned within and/or outside of interior 126: first tread section 210*a*, second tread section 210*b*, and connector section 280. In some embodiments, connector section 280 includes operating a bend drive at operation 1032. For example, the bend drive may be front connector bend drive 285' for bending front end 280' of connector section 280 relative to rear end 280" at front bend axis 292. In another example, the bend drive is rear connector bend drive 287' for bending rear end 280" of connector section 280 relative to front end 280' at rear bend axis 294. In some embodiments, the bending of multi-tread vehicle 200 at operation 1030 enables multi-tread vehicle 200 to access various portions of a wing bay compartment of interior space 126. In some embodiments, connector section 280 may be bent while advancing tread section 210*a* and/or tread section 210*b* into interior space 126.

At operation 1040, an image of interior 126 is captured. In some embodiments, an image is captured by camera 902*a* and/or camera 902*b* described in FIG. 9. At operation 1050, one or more operations are performed within interior 126. In various embodiments, operations include various interior wing tasks including maintenance, repair, and/or inspection procedures. Performing operations may include operating a highly-articulated arm within interior 126 at operation 1052. In some embodiments, a highly articulated arm includes an end effector that can be equipped to transport various tools and/or sensors, or to manipulate various parts and/or components to conduct interior wing tasks, such as maintenance, inspection and/or repairs, within interior space 126 of wing 120.

At operation 1060, a tread section, such as first tread section 210*a*, is advanced from interior space 126. In some embodiments, advancing tread section 210*a* from interior space 126 includes operating a driving motor at operation 1062. In some embodiments, operation 1062 includes the same and/or similar operations as operation 1012, as previously described. For example, operation 1062 may include activating front tread drive 232 and/or rear tread drive 234 of first tread section 210*a* and/or second tread section 210*b* to rotate in an opposite direction as that in operation 1010 in order to advance multi-tread vehicle in an opposite direction as that in operation 1010, in order to cause multi-tread vehicle 200 to exit interior 126.

In various embodiments, pivoting first tread section 210*a* at operation 1020 and bending connector section 280 at operation 1030 may be simultaneous or at least partially overlap in time. Operations 1020 and 1030 may also occur simultaneously or at least partially overlap in time with advancing first tread section 210*a* at operation 1010 and/or operation 1060. In some embodiments, operations 1040 and 1050 may also occur simultaneously or at least partially overlap in time with advancing first tread section 210*a* at operation 1010 and/or operation 1060.

FIGS. 11A-11D are schematic views of multi-tread vehicles within interior spaces at different stages of method 1000, in accordance with some embodiments. FIGS. 11A-11D depict wing 120 also described in FIGS. 1A-1C. FIGS. 11A, 11C, and 11D illustrate a horizontal cross-section of wing 120 from the viewpoint (identified in FIG. 1A) corresponding to the vertical axis (Z-axis) described in FIGS. 1A and 1C. FIG. 11B depicts a longitudinal cross-section of wing 120 from the C-C viewpoint (identified in FIG. 1A) corresponding to the longitudinal axis (Y-axis) described in FIGS. 1A-1C. As shown in FIGS. 11A-11D, wing 120 is defined by a leading edge 120*a*, a trailing edge 120*b*, an inboard end 120*c*, and an outboard end 120*d*. Wing 120 further includes eight ribs 122 defining wing bay compartments, including rib 122*a*, which lies on inboard end 120*c*, and ribs 122*b*, 122*c*, 122*d*, 122*e*. 122*f*, 122*g*, and 122*h*. As previously described in FIGS. 1A-1C, each of the ribs include one or more aligned openings 124 that define one or more internal operating paths of interior 126, including interior operating paths 126*a*, 126*b*, and 126*c*.

FIG. 11A shows three multi-tread vehicles 200 deployed within wing 120. Multi-tread vehicles 200*a*, 200*b*, and 200*c* deployed through openings 124 of rib 122*a* at inboard end 120*c* of wing 120, such as described in operation 1004. Other access openings may be provided within lower and/or upper wing skin panels that, in some embodiments, may be substantially parallel to the X-Y plane. When access through the skip portion openings, multi-tread vehicle 200 may have bending capabilities as, described above, with reference to FIGS. 7A-7C and 8B. In this example, the access direction may be at an angle (e.g., at a right angle) to the main advancing direction within wing 120. Multi-tread vehicle 200*a* has advanced within internal operating path 126*a*, as in operation 1010. Multi-tread vehicle 200*a* comprises one tread section, such as tread section 210, and connection point 1104*a*. Multi-tread vehicle 200*b* has also advanced within internal operating path 126*b*, such as in operation 1010. Multi-tread vehicle 200*b* comprises three tread sections, such as tread section 210, coupled to two connector sections, such as connector section 280, and was interconnected as described in operation 1002. Multi-tread vehicle 200*b* further comprises connection point 1104*b*. Multi-tread vehicle 200*c* has also advanced within interior operating path 126*c*, as in operation 1010. Multi-tread vehicle 200*c* comprises four tread sections, such as tread section 210, coupled to three connector sections, such as connector section 280, and was interconnected as described in operation 1002. Multi-tread vehicle 200*c* further comprises connection point 1104*c*. Various portions of multi-tread vehicles 200*b* and 200*c* outside of wing 120 are shown pivoting around pivoting axes in FIG. 11A, such as in operation 1020.

In various embodiments, connection points 1104*a*, 1004*b*, and 1104*c* may couple to various different components, including highly articulated effector arms, end effector mechanisms, tools, cameras, lighting, etc. As previously described, multi-tread vehicles 200*a*, 200*b*, and 200*c* may be utilized to advance components coupled to connection points 1104, 1104*b*, and 1104*c* into a desired location within wing 120 in order to conduct various internal wing tasks including inspection, maintenance, repair, etc., utilizing remote end effectors, such as in operation 1040 and 1050. Such internal wing tasks may additionally comprise drilling, fastening, sealing, cleaning, gauging, painting, etc. Multiple interior operating paths 126*a*, 126*b*, and 126*c* provide multiple parallel paths allow simultaneous performance of tasks. Multiple parallel paths also allow for servicing or removal of a jammed or broken components and/or portions of multi-tread vehicle 200, such as 200*a*, by another multi-tread vehicle, such as 200*b*.

FIG. 11B illustrates an alternative view showing multi-tread vehicle 200*c* within wing 120. The portions of multi-tread vehicle 200*c* that are located at the exterior of wing 120 may rest on platform 1102 as the various sections are advanced into or out of wing 120. In some embodiments, platform 1102 may be a surface within airframe 150 of aircraft 100. In other embodiments, platform 1102 may be a tender vehicle that supports the entire length of multi-tread vehicle 200*c*. In some embodiments, tread portions and connector portions of multi-tread vehicle 200*c* are folded along the top of the tender vehicle, as described in FIGS. 6A-6F. Multiple tender vehicles can be positioned side-by-side to support parallel and/or multiple tasks being conducted. In some embodiments, a tender vehicle is deployed below wing 120 with multi-tread vehicle 200c accessing interior 126 of wing 120 through a panel access port and/or opening 124 located at the bottom of wing 120.

As illustrated in FIG. 11B, two tread sections of multi-tread vehicle 200c have advanced into wing 120 and are each supported by one lower edge 125 of one opening 124. As previously described, the length of a tread section may be longer than the length of a wing bay compartment from rib to rib, such as from rib 122a to rib 122b, such that each tread section is supported by at least one edge 125 of rib 122 at all times. In some embodiments, connector sections are the same length as tread sections and keep each subsequent tread section at a distance such that multi-tread vehicle 200 with at least two tread section are simultaneously supported by at least two edges 125 of ribs 122 as it advances through interior 126 of wing 120. In some embodiments, there is minimal friction build up upon multi-tread vehicle 200c as each tread on all tread sections are rotating simultaneously to advance multi-tread vehicle 200c.

FIG. 11C, depicts fourth multi-tread vehicle 200d entering wing 120 through an access port opening 124 at outboard end 120d of wing 120. Because aircraft wings are typically narrower at the tip than at the base, outboard end 120d of wing 120 may include fewer access port openings 124 than the base of wing 120 at inboard end 120c. For this reason, openings 124 at outboard end 120d may also be narrower than openings 124 located at inboard end 120c.

FIG. 11D depicts multi-tread vehicle 200e comprising two tread sections, 210a and 210b, coupled by connector section 280. Multi-tread vehicle 200e further comprises connecting point 1104e and tether 1106 coupled to tread section 210b. In some embodiments, tether 1106 supplies multi-tread vehicle 200e with electrical power from a power source. Tether 1106 may also include piping and/or other tubing to provide hydraulic power air pressure, and/or data transfer capabilities. In such embodiments, multi-tread vehicle 200e with tether 1106 can function with fewer tread and connector sections, which provides for less complexity and hardware.

In various embodiments, use of multi-tread vehicle 200, as described in the present disclosure allows for an improved design of wing 120. Use of multi-tread vehicle 200 for internal wing tasks eliminates the need for a mechanic to enter into interior 126 of wing 120. This, in turn, allows for the elimination of access ports at the bottom and/or top of wing 120, which provides for a lighter and more simplified structure because less components are needed and the wing skin panels is less pierced or interrupted by access ports. Additionally, only having to accommodate multi-tread vehicle 200 and the tools needed to be transported into the wing, instead of a human mechanic, wing 120 can be constructed with a thinner profile with a shallower depth, providing less drag and improved performance.

Examples of Aircraft and Methods of Fabricating and Operating Aircraft

Figure 12:
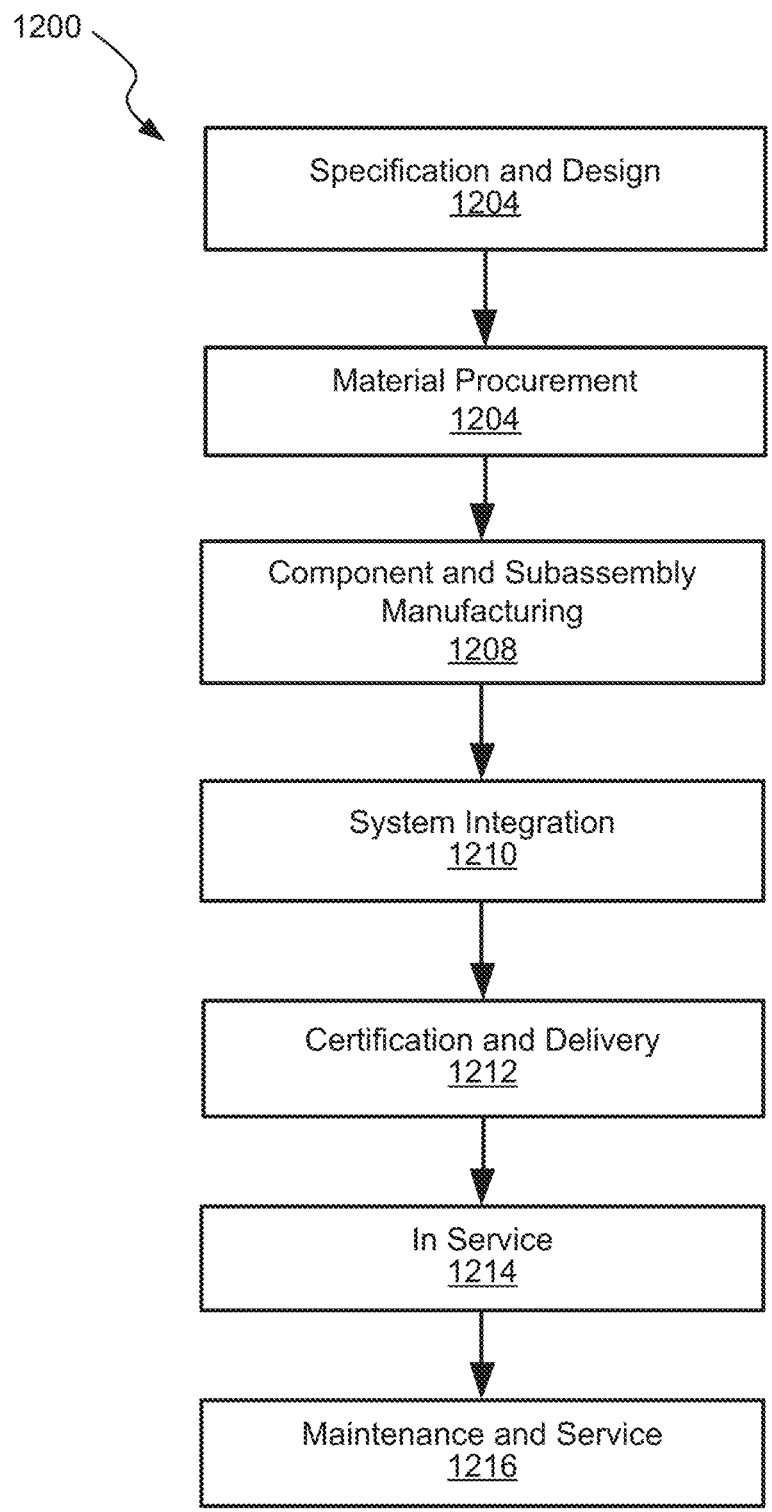
FIG. 12 is a block diagram of aircraft production and service methodology that may utilize methods and assemblies described herein.

Examples of the present disclosure may be described in the context of aircraft manufacturing and service method 1200 as shown in FIG. 12 and aircraft 100 as shown in FIG. 1A. During pre-production, illustrative method 1200 may include specification and design (block 1204) of aircraft 100 and material procurement (block 1206). During production, component and subassembly manufacturing (block 1208) and inspection system integration (block 1210) of aircraft 100 may take place. Described methods and assemblies formed by these methods and including multi-tread vehicle can be used in any of specification and design (block 1204) of aircraft 100, material procurement (block 1206), component and subassembly manufacturing (block 1208), and/or inspection system integration (block 1210) of aircraft 100.

Thereafter, aircraft 100 may go through certification and delivery (block 1212) to be placed in service (block 1214). While in service, aircraft 100 may be scheduled for routine maintenance and service (block 1216). Routine maintenance and service may include modification, reconfiguration, refurbishment, etc. of one or more inspection systems of aircraft 100. Described methods and assemblies formed by these methods and including multi-tread vehicle can be used in any of certification and delivery (block 1212), service (block 1214), and/or routine maintenance and service (block 1216).

Each of the processes of illustrative method 1200 may be performed or carried out by an inspection system integrator, a third party, and/or an operator (e.g., a customer). For the purposes of this description, an inspection system integrator may include, without limitation, any number of aircraft manufacturers and major-inspection system subcontractors; a third party may include, without limitation, any number of vendors, subcontractors, and suppliers; and an operator may be an airline, leasing company, military entity, service organization, and so on.

As shown in FIG. 1A, aircraft 100 produced by illustrative method 1200 may include airframe 150 with an interior 170. As previously described, aircraft 100 further includes right wing 120 and left wing 121 coupled to airframe 150, with engine 130 coupled to right wing 120 and engine 131 coupled to left wing 121. Airframe 150 further includes a number of high-level inspection systems such as electrical inspection system 140 and environmental inspection system 160. Any number of other inspection systems may be included. Although an aerospace example is shown, the principles disclosed herein may be applied to other industries, such as the automotive industry. Accordingly, in addition to aircraft 100, the principles disclosed herein may apply to other vehicles, e.g., land vehicles, marine vehicles, space vehicles, etc.

Apparatus(es) and method(s) shown or described herein may be employed during any one or more of the stages of manufacturing and service method (illustrative method 1200). For example, components or subassemblies corresponding to component and subassembly manufacturing (block 1208) may be fabricated or manufactured in a manner similar to components or subassemblies produced while aircraft 100 is in service (block 1214). Also, one or more examples of the apparatus(es), method(s), or combination thereof may be utilized during production stages (block 1208) and (block 1210), for example, by substantially expediting assembly of or reducing the cost of aircraft 100. Similarly, one or more examples of the apparatus or method realizations, or a combination thereof, may be utilized, for example and without limitation, while aircraft 100 is in service (block 1214) and/or during maintenance and service (block 1216).

Conclusion

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus (es) and method(s) disclosed herein in any combination, and all of such possibilities are intended to be within the spirit and scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

What is claimed is:

1. A multi-tread vehicle comprising:
   a first tread section comprising a first front tread portion and a first rear tread portion coupled to the first front tread portion,
   the first front tread portion comprising a first front right tread and a first front left tread,
   the first front right tread and the first front left tread having different lengths, and
   the first rear tread portion comprising a first rear right tread and a first rear left tread.

2. The multi-tread vehicle of claim 1, wherein the first front right tread and the first rear left tread have same lengths.

3. The multi-tread vehicle of claim 1, wherein the first rear tread portion is detachably coupled to the first front tread portion using a first detachable tread coupling.

4. The multi-tread vehicle of claim 1, further comprising:
   a second tread section, comprising a second front tread portion and a second rear tread portion, coupled to the second front tread portion,
   the second front tread portion comprising a second front right tread and a second front left tread,
   the second rear tread portion comprising a second rear right tread and a second rear left tread; and
   a connector section, coupled to the first rear tread portion and to the second front tread section.

5. The multi-tread vehicle of claim 4, wherein the first rear tread portion of the first tread section comprises a rear tread pivot coupling, pivotably coupled to a front connector pivot coupling of the connector section.

6. The multi-tread vehicle of claim 5, wherein the first tread section and the second tread section are identical.

7. The multi-tread vehicle of claim 4, wherein:
   the multi-tread vehicle is foldable between an extended state and a folded state,
   in the extended state, the first front right tread and the second front right tread are collinear, and
   in the folded state, the first front left tread is disposed between the first front right tread and the second front right tread.

8. The multi-tread vehicle of claim 7, wherein in the folded state the first front left tread is adjacent to and parallel to the second front right tread.

9. The multi-tread vehicle of claim 8, wherein:
   the first front tread portion comprises a first front pivot axis,
   the first rear tread portion comprises a first rear pivot axis,
   the second front tread portion comprises a second front pivot axis,
   the second rear tread portion comprises a second rear pivot axis; and
   in the folded state, a distance between the first rear pivot axis and the second front pivot axis is equal to a square root of a sum of a square of a distance between the first front pivot axis and the first rear pivot axis and a square of a distance between the first front pivot axis and the second front pivot axis.

10. The multi-tread vehicle of claim 9, wherein, in the folded state, the distance between the first front pivot axis and the second front pivot axis is equal to a width of the first tread section.

11. A method for using a multi-tread vehicle, the method comprising:
    advancing the multi-tread vehicle through an interior space of a structure comprising a first rib,
      the multi-tread vehicle comprising a first front right tread and a first rear right tread, separated by a first right tread gap from the first front right tread, and
      further comprising a first front left tread and a first rear left tread, separated by a first left tread gap from the first front left tread, wherein the first front right tread and the first front left tread have different lengths;
    advancing the multi-tread vehicle comprises contacting the first rib with the first front right tread supporting the multi-tread vehicle while the first left tread gap passes the first rib; and
    advancing the multi-tread vehicle comprises contacting the first rib with the first rear left tread and supporting the multi-tread vehicle while the first right tread gap passes the first rib.

12. The method of claim 11, wherein advancing the multi-tread vehicle through the interior space comprises advancing the multi-tread vehicle through an opening in the first rib.

13. The method of claim 11, wherein-advancing the multi-tread vehicle comprises contacting the first rib with a second tread section of the multi-tread vehicle while a first tread section of the multi-tread vehicle is advanced between the first rib and a second rib of the structure and without contacting the structure, the second tread section coupled to the first tread section using a connector section, the first tread section comprising the first front right tread the first rear right tread, the first front left tread, and the first rear left tread.

14. The method of claim 13, wherein advancing the multi-tread vehicle comprises contacting the second rib with the first tread section before the second tread section passes the first rib.

15. The method of claim 13, wherein advancing the multi-tread vehicle comprises contacting the first rib with the first tread section while the second tread section is advanced toward the first rib.

16. A method for using a multi-tread vehicle, the method comprising:
    positioning the multi-tread vehicle at an opening to an interior space, the multi-tread vehicle comprising a first tread section comprising a first front tread portion and a first rear tread portion coupled to the first front tread portion, the first front tread portion comprising a first front right tread and a first front left tread, the first front right tread and the first front left tread having different lengths; and advancing at least the first tread section of the multi-tread vehicle into the opening to the interior space.

17. The method of claim 16, further comprising advancing a second tread section and a connector section of the multi-tread vehicle into the opening to the interior space, wherein the second tread section comprises a second front tread portion and a second rear tread portion coupled to the second front tread portion, and wherein the connector section is coupled to the first rear tread portion and to the second front tread portion.

18. The method of claim 17, further comprises bending a front end of the connector section relative to a rear end of the connector section around a front bend axis parallel to a plane defined by the first rear tread portion.

19. The method of claim 18, wherein bending is performed using a front connector bend drive of the connector section.

20. The method of claim 18, wherein bending the connector section at least partially overlaps in time with advancing the first tread section.

21. A method for using a multi-tread vehicle, the method comprising:

advancing the multi-tread vehicle through an interior space of a structure comprising a first rib,
the multi-tread vehicle comprising a first front right tread and a first rear right tread, separated by a first right tread gap from the first front right tread, and further comprising a first front left tread and a first rear left tread, separated by a first left tread gap from the first front left tread;
advancing the multi-tread vehicle comprises contacting the first rib with the first front right tread supporting the multi-tread vehicle while the first left tread gap passes the first rib;
advancing the multi-tread vehicle comprises contacting the first rib with the first rear left tread and supporting the multi-tread vehicle while the first right tread gap passes the first rib; and
advancing the multi-tread vehicle comprises contacting the first rib with a second tread section of the multi-tread vehicle while a first tread section of the multi-tread vehicle is advanced between the first rib and a second rib of the structure and without contacting the structure, the second tread section coupled to the first tread section using a connector section, the first tread section comprising the first front right tread the first rear right tread, the first front left tread, and the first rear left tread.

* * * * *